United States Patent
Nunez Sanchez et al.

(10) Patent No.: US 11,067,449 B2
(45) Date of Patent: Jul. 20, 2021

(54) MULTISPECTRAL IMAGER

(71) Applicant: The Johns Hopkins University, Baltimore, MD (US)

(72) Inventors: Jorge I. Nunez Sanchez, Washington, DC (US); Rachel L. Klima, Columbia, MD (US); Scott L. Murchie, Mt. Airy, MD (US); Seppo J. Lehtonen, Columbia, MD (US); John D. Boldt, Catonsville, MD (US); Jacob M. Greenberg, Columbia, MD (US); Bryan J. Maas, Baltimore, MD (US); Kyle L. Anderson, Washington, DC (US); Trevor W. Palmer, White Stone, VA (US); Heidi E. Warriner, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/013,545

(22) Filed: Sep. 5, 2020

(65) Prior Publication Data
US 2021/0096027 A1 Apr. 1, 2021

Related U.S. Application Data

(60) Provisional application No. 62/908,026, filed on Sep. 30, 2019.

(51) Int. Cl.
*G01J 3/02* (2006.01)
*G01J 3/28* (2006.01)
*G01J 3/36* (2006.01)

(52) U.S. Cl.
CPC .......... *G01J 3/2823* (2013.01); *G01J 3/0208* (2013.01); *G01J 3/36* (2013.01); *G01J 2003/2826* (2013.01)

(58) Field of Classification Search
CPC .......... G01J 3/2823; G01J 3/0208; G01J 3/36; G01J 2003/2826; G01J 2003/1213;
(Continued)

(56) References Cited

U.S. PATENT DOCUMENTS 10,606,055 B2 * 3/2020 Horstmeyer .......... G02B 21/16

OTHER PUBLICATIONS

Jorge Nunez, et al., "SESS04a-09: The Advanced Multispectral Infrared Microimager (AMIM) for Future Sn Situ Exploration of Planetary Surfaces," abstract for Low-Cost Planetary Missions Conference (LCPM)-12, Pasadena, CA, Aug. 15, 2017, p. 13.
(Continued)

*Primary Examiner* — Abdullahi Nur
(74) *Attorney, Agent, or Firm* — Noah J. Hayward

(57) ABSTRACT

A multispectral imager includes processing circuitry, an illumination assembly, a detector assembly, and a focusing assembly. The illumination assembly includes an array of illumination elements controlled by the processing circuitry to illuminate a scene. The detector assembly includes a detector array controlled by the processing circuitry to capture images from the scene at different wavelengths. The focusing assembly includes a lens and is controlled by the processing circuitry to adjust a focal point for the detector array. The processing circuitry generates and processes the images from the scene, taken at different wavelengths and focal points, combines the images to form a multispectral image cube for the scene, and determines a composition of an object within the scene based on a spectral profile of the multispectral image cube.

20 Claims, 11 Drawing Sheets

(58) Field of Classification Search
CPC ........ G01J 3/12; G01J 3/10; G01J 3/32; G01J 3/28; G01J 3/02; A61B 1/04; A61B 34/35; G02B 27/10
See application file for complete search history.

(56) References Cited

OTHER PUBLICATIONS

Jorge Nunez, et al., "The Advanced Multispectral Infrared Microimager (AMIM) for Future In Situ Exploration of Planetary Surfaces," poster for Low-Cost Planetary Missions Conference (LCPM)-12, Pasadena, CA, Aug. 15, 2017, 1 page.
J. I. Nunez, et al., "The Advanced Multispectral Infrared Microimager (AMIM) for the In Situ Exploration of Planetary Surfaces," abstract #2780 for the 49th Lunar and Planetary Science Conference 2018, The Woodlands, TX, Mar. 19, 2018, pp. 1-2.
J. I. Nunez, et al., "The Advanced Multispectral Infrared Microimager (AMIM) for the In Situ Exploration of Planetary Surfaces," poster for the 49th Lunar and Planetary Science Conference 2018, The Woodlands, TX, Mar. 19, 2018, 1 page.

\* cited by examiner

MULTISPECTRAL IMAGER

CROSS-REFERENCE TO RELATED APPLICATIONS

This application claims priority to and the benefit of prior-filed, co-pending U.S. Provisional Application Ser. No. 62/908,026 filed on Sep. 30, 2019, the entire contents of which are hereby incorporated herein by reference.

STATEMENT OF GOVERNMENTAL INTEREST

This invention was made with Government support under contract number NNX16AJ37G awarded by the National Aeronautics and Space Administration (NASA). The Government has certain rights in the invention.

TECHNICAL FIELD

Example embodiments generally relate to imaging systems and, in particular, relate to multispectral imaging systems.

BACKGROUND

Microscopic imaging is an essential tool for geologists both in the field and in the laboratory. While some information about geology may be gathered by microscopic visual inspection of rocks and soils, such as with a hand lens or digital camera, analysis using high-powered microscopy over broad, spectral ranges can also be very powerful for identifying the characteristics and contents of geologic materials. The spatial microscale textural relationship between individual mineral grains is essential for properly identifying rocks and soils and interpreting their geologic histories. While a laboratory environment including bulky imaging equipment, such as a petrographic microscope, could be used to perform some of these types of analyses, such a solution for geologic studies in the field in a compact, light-weight form factor is simply not currently available.

For example, such laboratory equipment and facilities are not available for highly remote geologic studies, such as in the context of planetary surface exploration. In this regard, a robotic lander or rover may be required to include the functionality to make such geologic studies of a scene, without the assistance of a nearby geologists and laboratories. Such a planetary exploration robot must therefore include on-board instrumentation that is capable of capturing images of the remote geology and conducting analyses of the same. Such robots may use imagers in the form cameras and other detectors to capture images of the geology for analysis to, for example, identify rocks and soils and interpret the geologic histories of such remote geologic specimen. However, the ability to use of spectral analysis in this context is still quite limited.

Conventional imagers, particularly those used in the context of planetary robotic exploration, have spectral limitations, such as imagers in the visible range, that prevent the ability to obtain a robust spectral profile of the geologic scenes for analysis. Since certain elements and minerals reflect and absorb certain wavelengths of light differently, having a broad, and discrete, spectral range for an imager is important for accurate studies. Further, weight, size, and power limitations also factor into considerations for imaging systems, particularly in the context of planetary robotic explorers. As such, improvements in the area of imaging technology, particularly with respect to small, light-weight spectral imaging, is a continued need for geologic studies, particularly for use in remote locations such as distant planetary surfaces. This is also applicable to remote geological investigations in terrestrial field locations where access to laboratory equipment is limited.

BRIEF SUMMARY

According to example embodiments, a multispectral imager includes processing circuitry, an illumination assembly, a detector assembly, and a focusing assembly. The illumination assembly includes an array of illumination elements, and the illumination assembly is configured to be controlled by the processing circuitry to illuminate a scene at a plurality of wavelengths, including a first wavelength and a second wavelength. The detector assembly includes a detector array, and is configured to be controlled by the processing circuitry to capture images at the plurality of wavelengths. The focusing assembly includes a lens, and is configured to be controlled by the processing circuitry to adjust a focal point for the detector array. The processing circuitry is configured to generate a first plurality of images of the scene based on images captured by the detector assembly illuminated by the illumination assembly at the first wavelength, with each image in the first plurality of images being captured at a respective different focal point. The processing circuitry is also configured to combine the images of the first plurality of images to form a first merged image for the first wavelength, to generate a second plurality of images of the scene based on images captured by the detector assembly illuminated by the illumination assembly at the second wavelength, with each image in the second plurality of images being captured at a respective different focal point, to combine the images of the second plurality of images to form a second merged image for the second wavelength, to combine the first merged image with the second merged image to form a multispectral image cube for the scene, and to determine a composition of an object within the scene based on a spectral profile of the multispectral image cube.

According to other example embodiments, a multispectral imaging method includes generating a first plurality of images of a scene based on images captured by a detector assembly and illuminated by an illumination assembly at a first wavelength, where each image in the first plurality of images being captured at a respective different focal point within the first plurality of images via adjustment of a focusing assembly. The method also includes combining the images of the first plurality of images to form a first merged image for the first wavelength, generating a second plurality of images of the scene based on images captured by the detector assembly illuminated by the illumination assembly at a second wavelength, with each image in the second plurality of images being captured at a respective different focal point within the second plurality of images via adjustment of the focusing assembly, combining the images of the second plurality of images to form a second merged image for the second wavelength, combining the first merged image with the second merged image to form a multispectral image cube for the scene, and determining a composition of an object within the scene based on a spectral profile of the multispectral image cube.

BRIEF DESCRIPTION OF THE DRAWINGS

Figure 1:
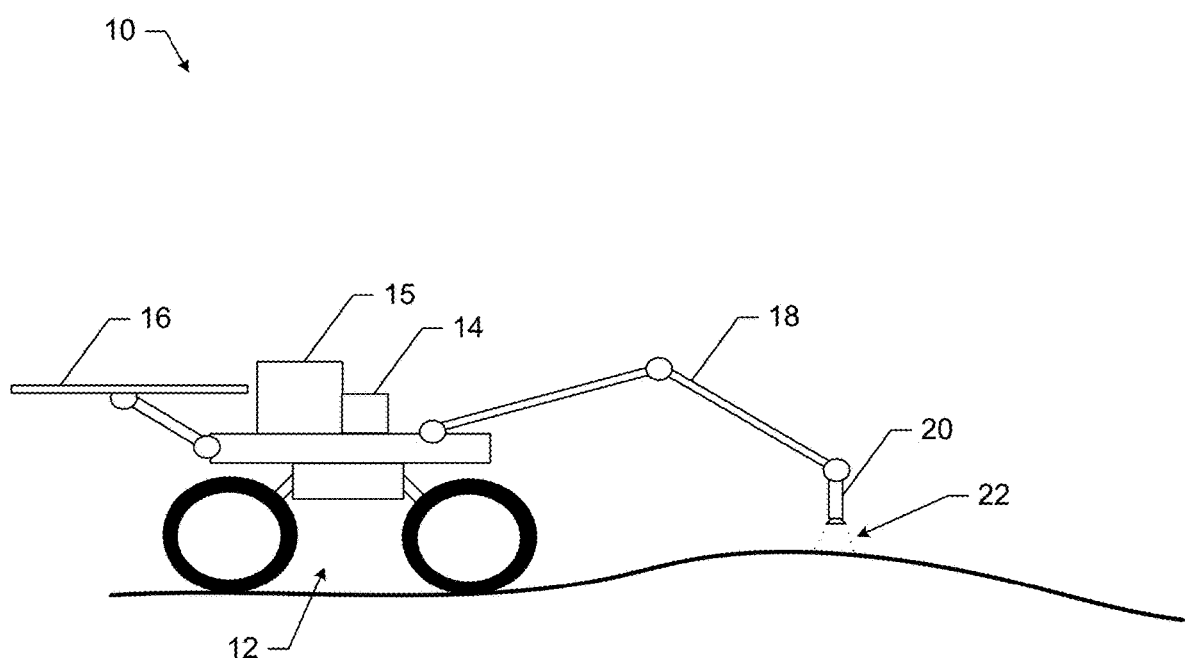
Figure 2:
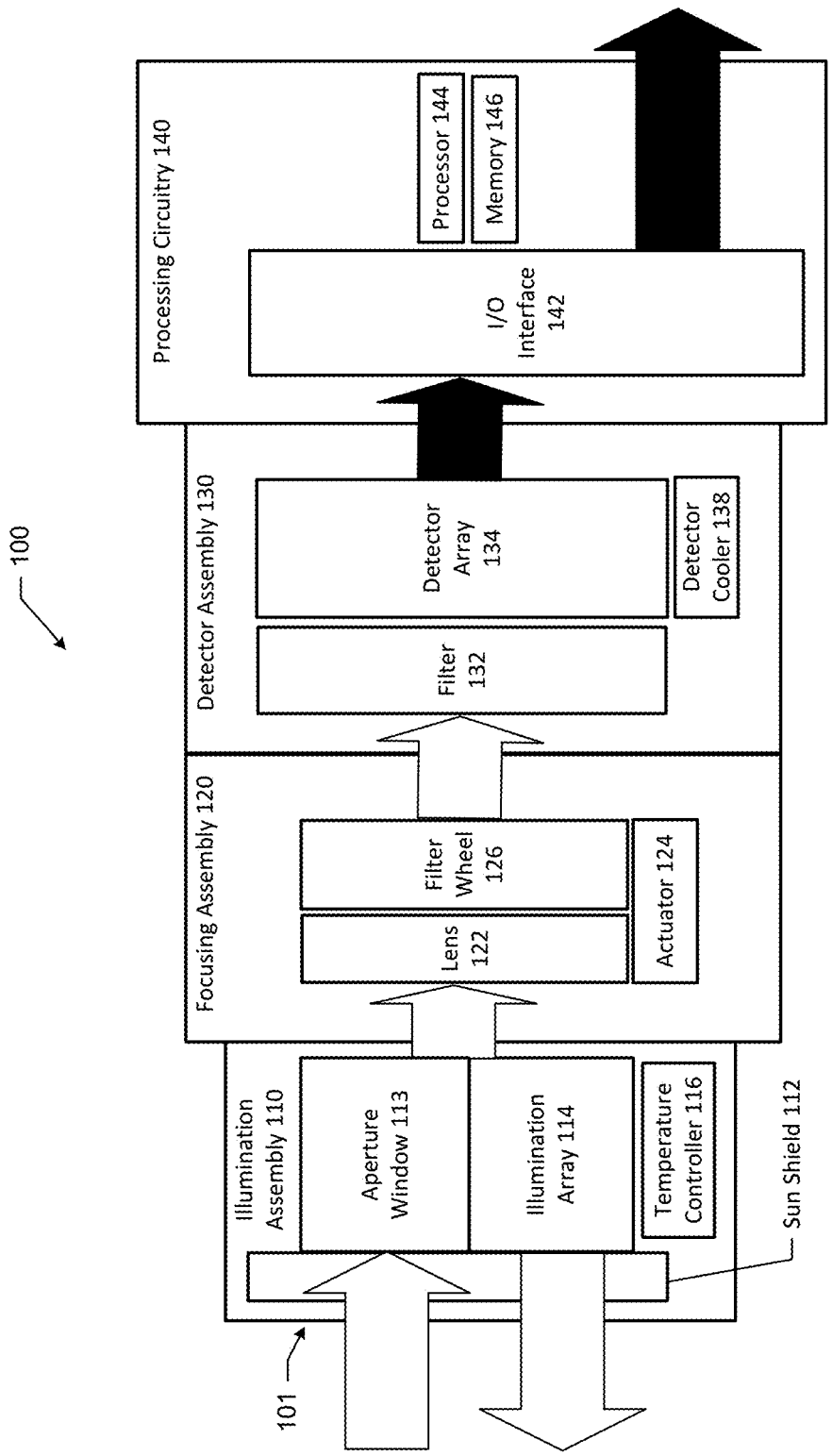
Figure 3A:
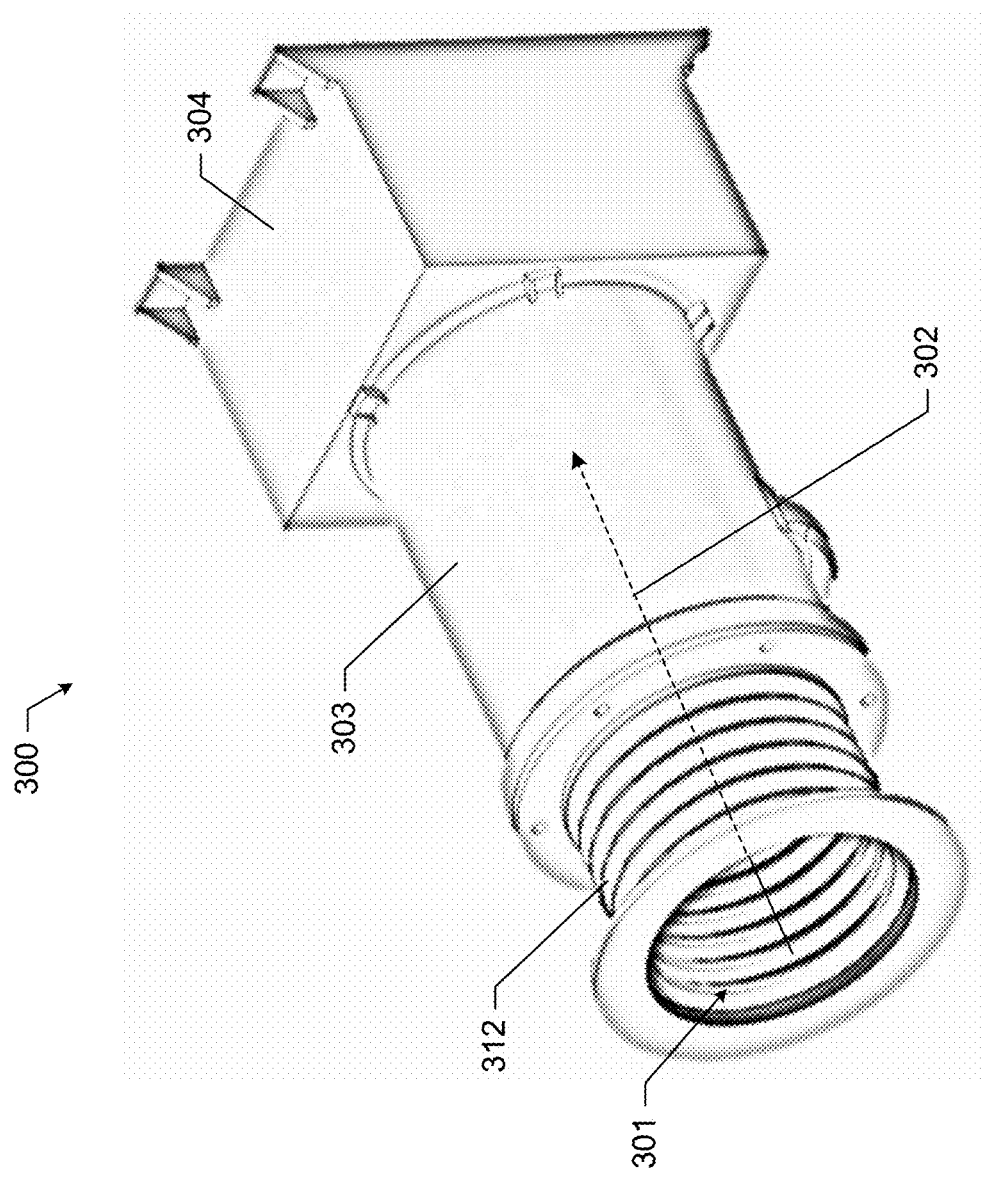
Figure 3B:
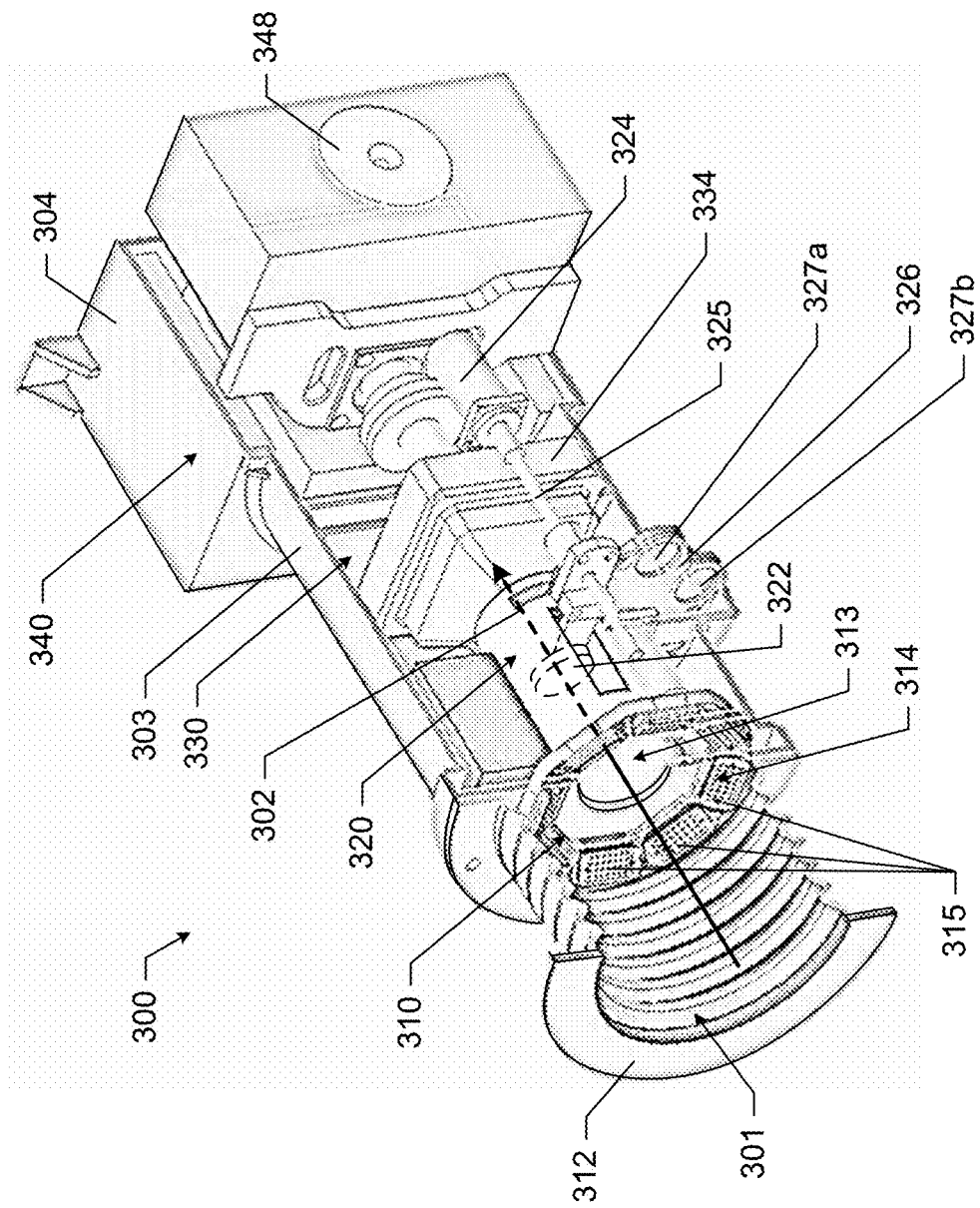
Figure 4:
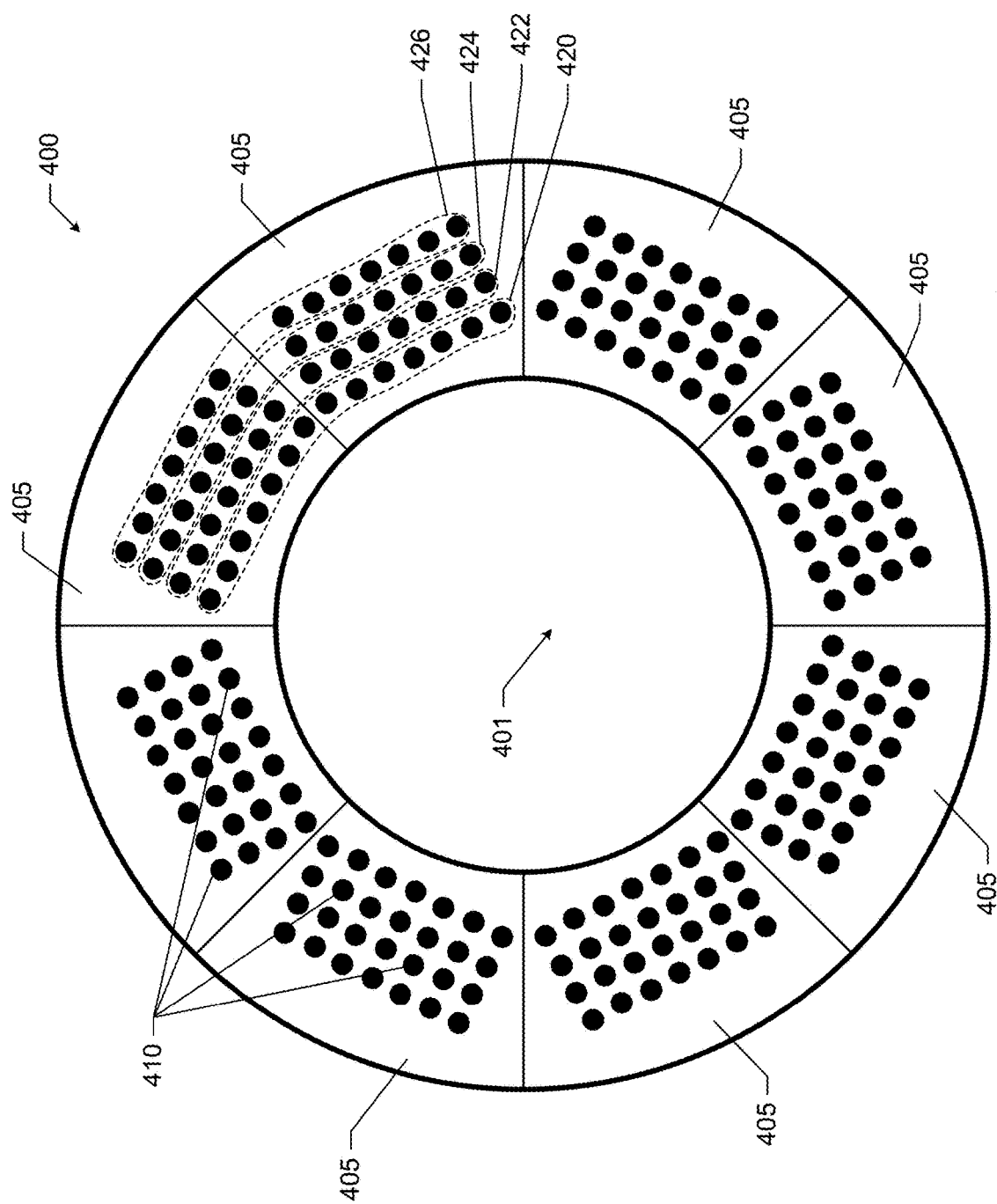
Figure 5:
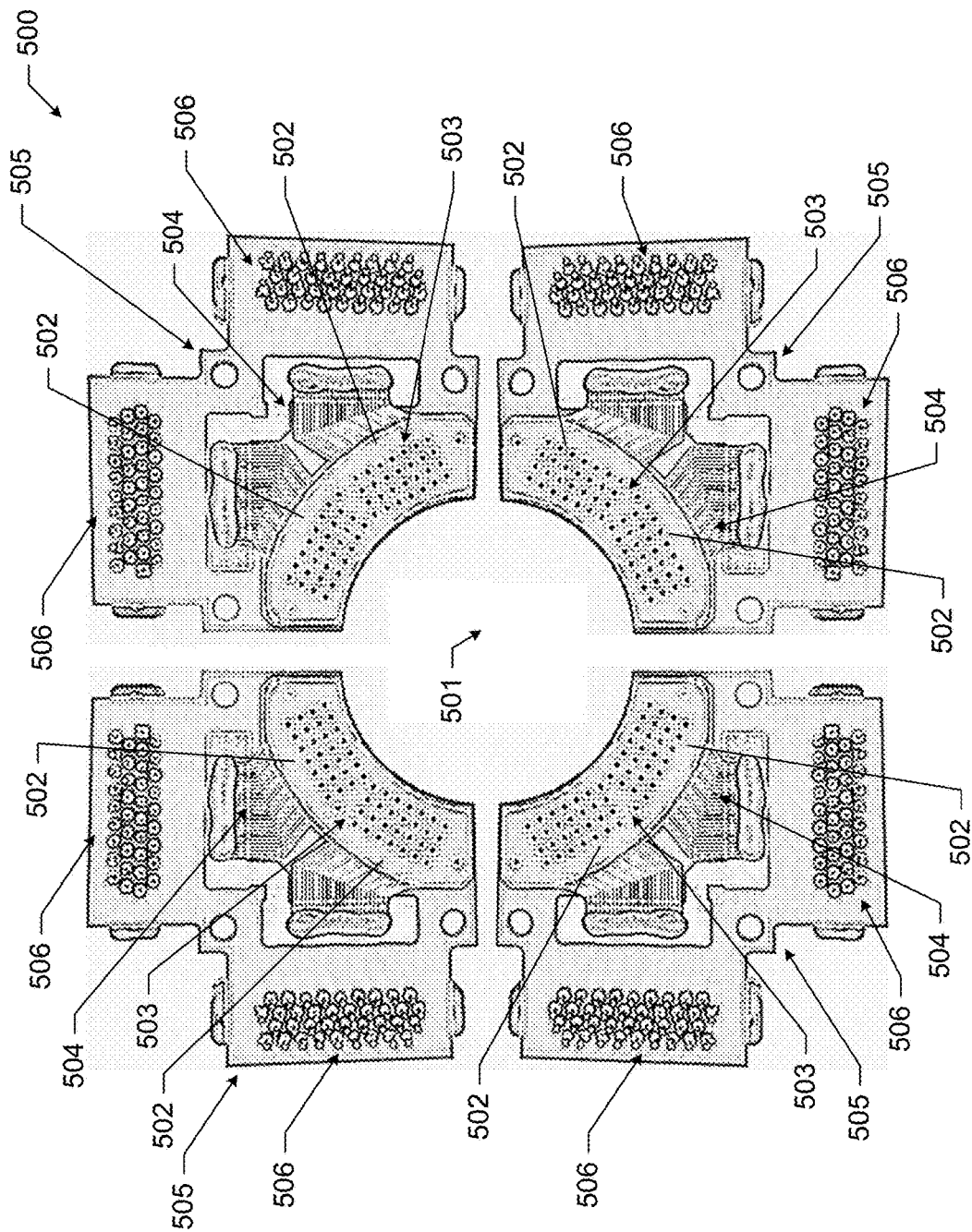
Figure 6:
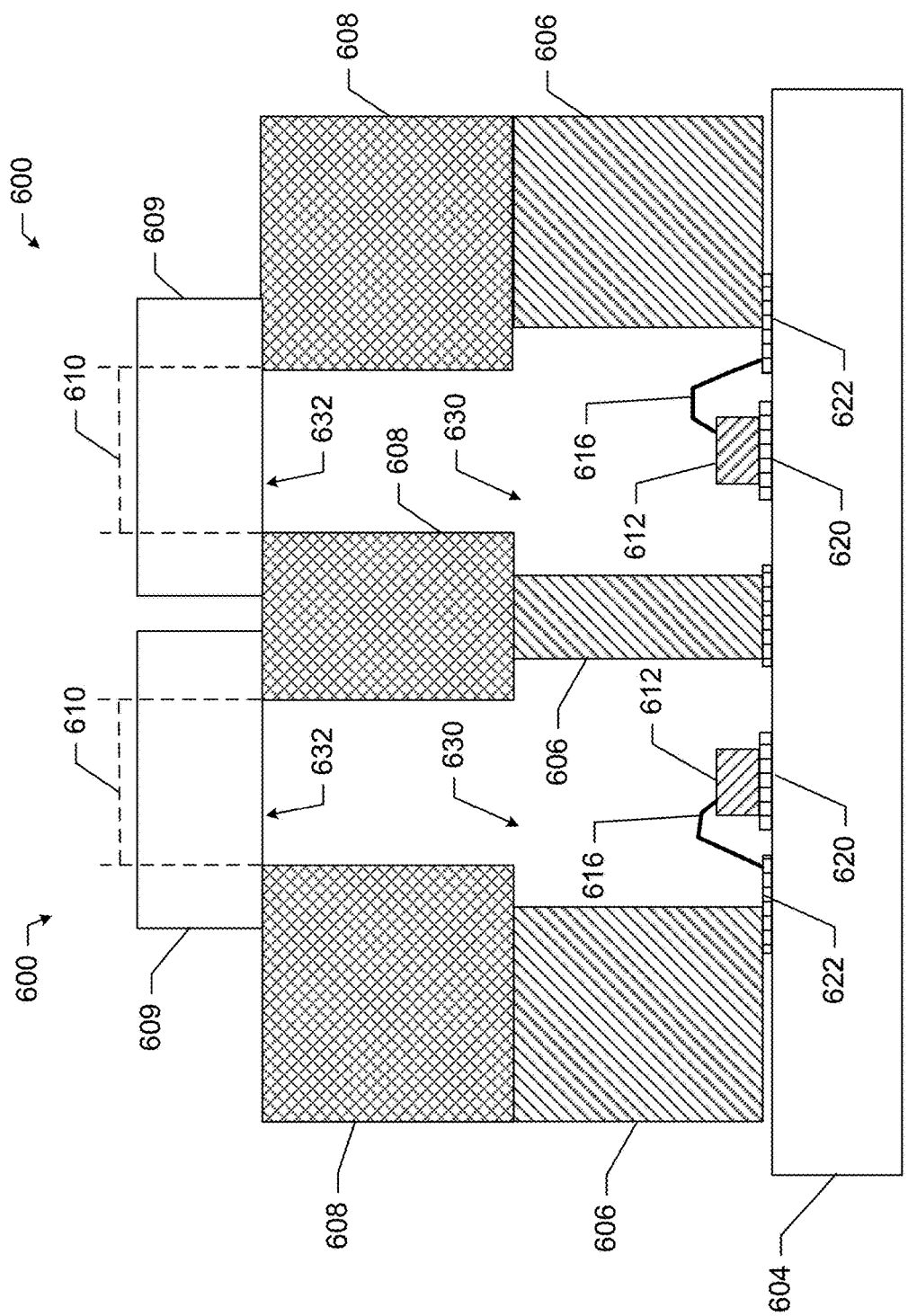
Figure 7:
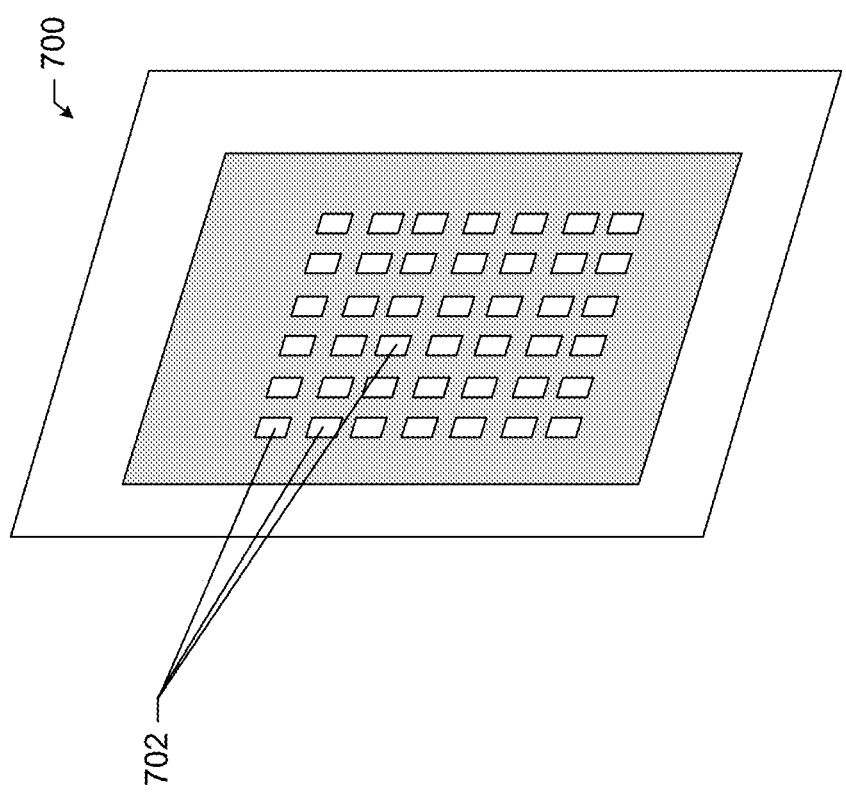
Figure 8:
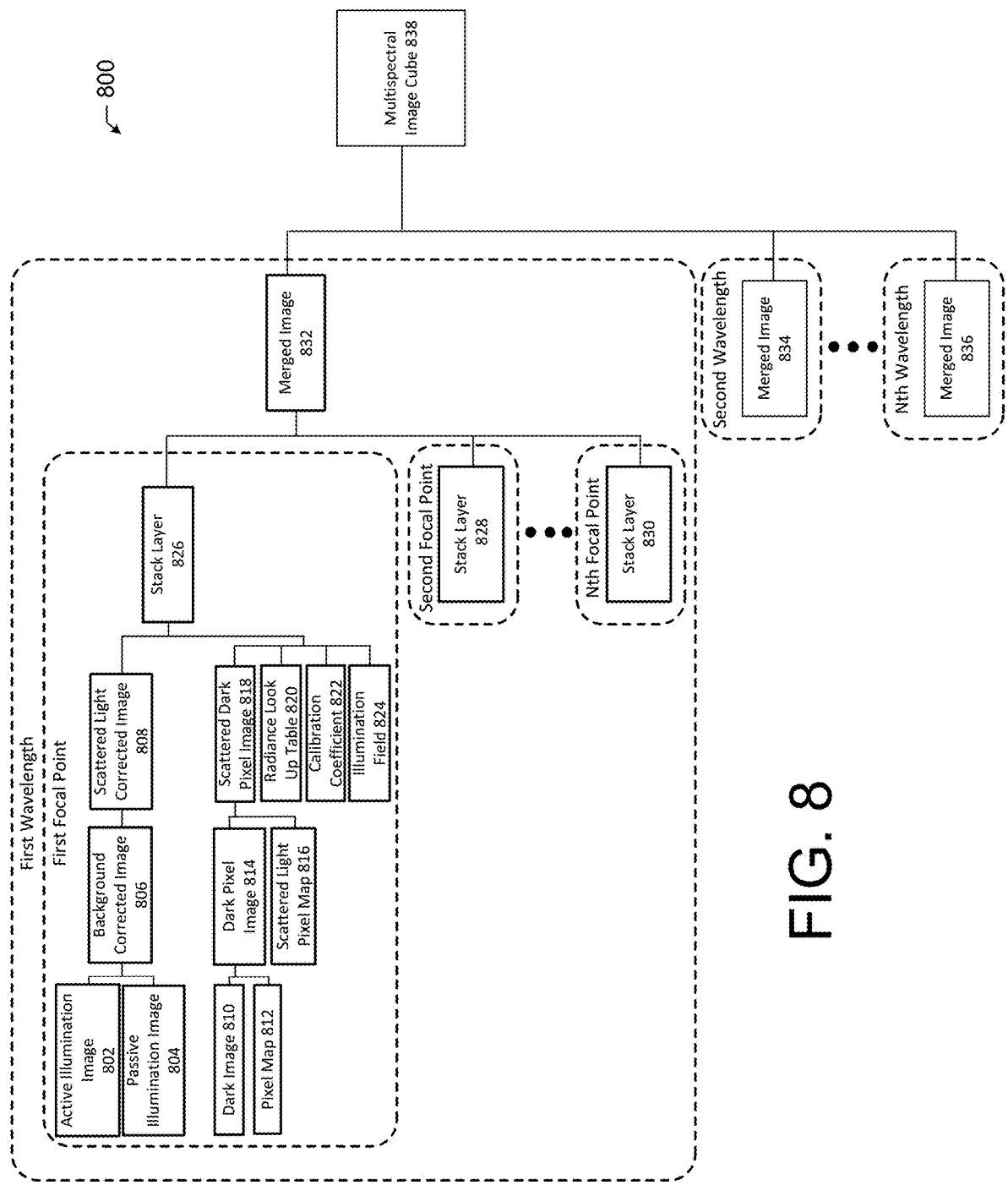
Figure 9:
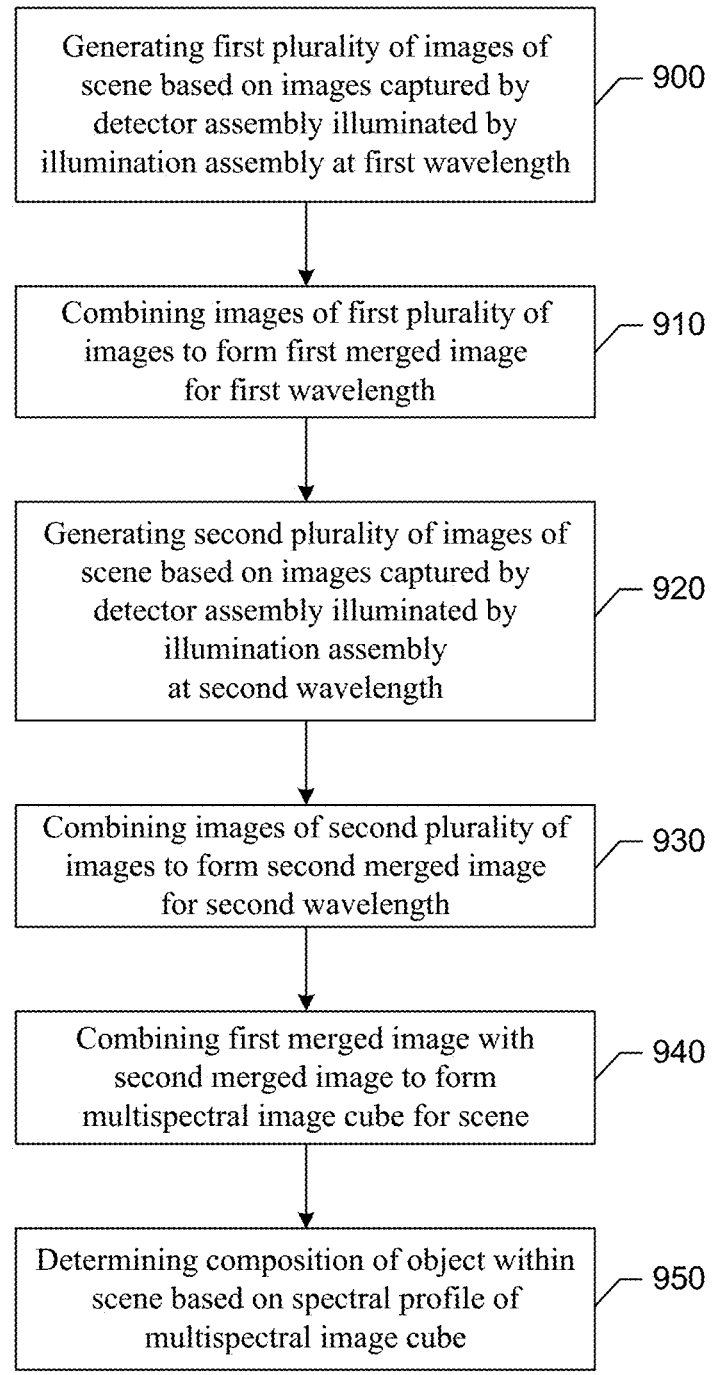
Figure 10:
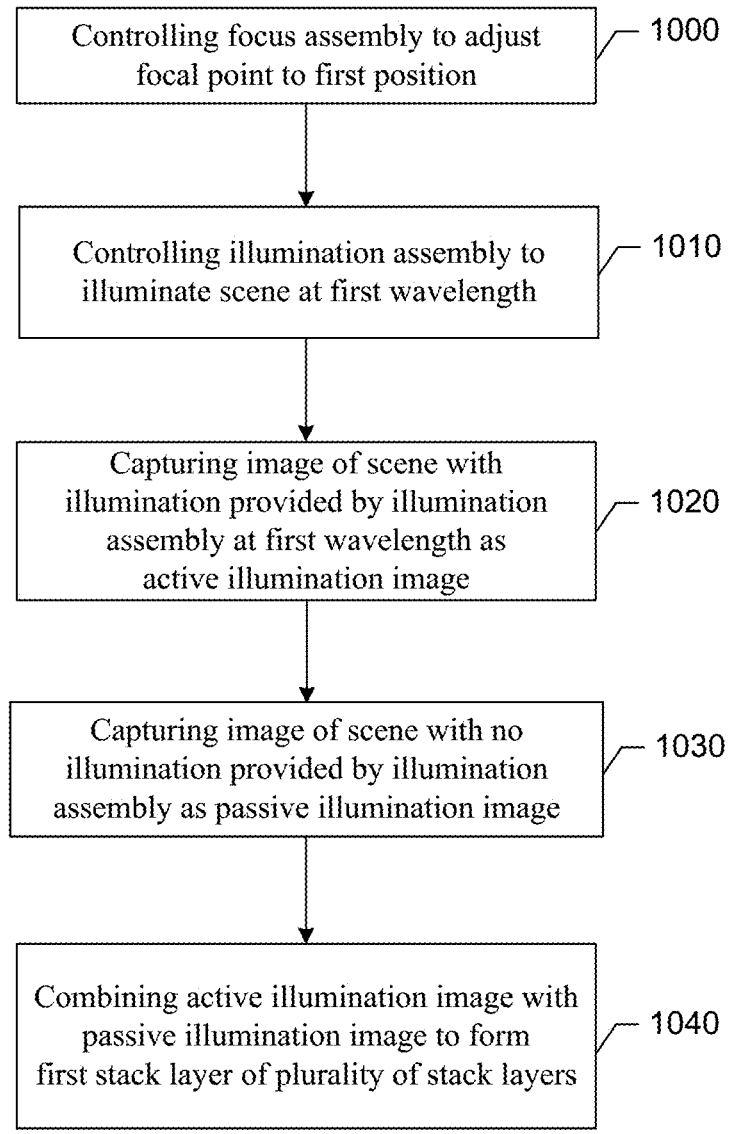

Having thus described some example embodiments in general terms, reference will now be made to the accompanying drawings, which are not necessarily drawn to scale, and wherein:

FIG. 1 illustrates a multispectral imager applied in the context of a planetary rover according to some example embodiments;

FIG. 2 is a functional block diagram of a multispectral imager according to some example embodiments;

FIG. 3A is a perspective side view of a multispectral imager according to some example embodiments;

FIG. 3B is a perspective side view of the multispectral imager of FIG. 3A with a partial cross-section view according to some example embodiments;

FIG. 4 is a front view of an illumination array according to some example embodiments;

FIG. 5 is a front view of another illumination array according to some example embodiments;

FIG. 6 is a cross-section view of the architecture of example illumination elements of an illumination array according to some example embodiments;

FIG. 7 is an illustration of a detector array according to some example embodiments;

FIG. 8 is block diagram illustrating a process flow of a method of generating a multispectral image cube according to some example embodiments;

FIG. 9 is a flowchart of a method for multispectral image capture to generate a multispectral image cube according to some example embodiments; and FIG. 10 is a flowchart of a method for generating calibrated images to facilitate the generation of a multispectral image cube according to some example embodiments.

DETAILED DESCRIPTION

Some non-limiting, example embodiments will now be described more fully with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. The term "or" as used herein is defined as the logical or that is true if either or both are true.

According to various example embodiments, multispectral imaging systems and methods are described herein that improve upon conventional imaging technologies. In this regard, for example, an advanced multispectral imager configured to operate at microscopic levels in both the visible and infrared spectrum, at discrete controllable wavelengths, is described. The multispectral imager may be configured to operate in a microscopic operational mode (e.g., being able to resolve grains of fine sand less than 60 microns in diameter) and a macroscopic operational mode (e.g., capable of imaging at remote distances while maintaining focus). Some example embodiments of the multispectral imager are compact, light-weight, and low-power, and are therefore effective for use in, for example, remote field geology or robotic planetary exploration.

Such a multispectral imager, according to some example embodiments, includes an illumination assembly that includes an array of illumination elements. The illumination elements include, in some example embodiments, groups of elements that are configured to output various controllable wavelengths of light to be used for image capture illumination. In this regard, the multispectral imager may be configured to operate in the visible, near-infrared, short-wave infrared, and mid-wave infrared spectrum depending on the application. The illumination elements, which may be multispectral light emitting diodes (LEDs), may be controlled to illuminate a scene (e.g., a geologic scene) across a number of different wavelengths. The illumination elements may include respective bandpass filters that limit the illumination wavelengths to narrow spectral bands to obtain a discrete spectral response within a captured image. The illumination assembly may therefore be configured to output a number of discrete wavelengths using the groups of illumination elements to allow for a common geologic scene to be analyzed with respect to each of the various wavelengths of illumination. According to some example embodiments, the illumination elements may be radially disposed around an optical aperture of the multispectral imager to ensure high-quality illumination. Additionally, the elements may be individually connected and separately addressable to support continued, high-quality operation of the illumination assembly in the event of individual illumination element failures. Further, according to some example embodiments, to ensure consistent output of light at the desired wavelengths, the illumination assembly may be temperature-controlled by, for example, a heater or a cooler device, such as a controlled thermoelectric cooler, to avoid temperature-based wavelength deviations.

The multispectral imager may also include a focusing assembly that includes one or more lenses and other optics to support the capture of images spanning the broad spectral range of the instrument and between microscopic and macroscopic. In this regard, the focusing assembly may include one or more movable lenses that allow a focal point (or focal length) of a detector array, which may be a photodetector array, of the multispectral imager to be changed. Focusing in this manner may be used to capture a series of images of the same scene with different focal points, as further described below. According to some example embodiments, to change the focal point, at least one lens may be operably coupled to an actuator (e.g., a stepper motor) that is configured to move the lens and achieve different focal points. Additionally, according to some example embodiments, the focusing assembly may include a filter wheel including a number of filter windows, with each filter window being configured to filter a certain wavelength or band of light. At least one of the filter windows may be configured to pass ambient light wavelengths, for example without use of illumination light from the illumination assembly, to facilitate imaging at longer focal lengths. Imagining at relatively longer focal lengths, using the ambient light illumination, may assist with scene targeting prior to performing imaging at the higher-power, microscopic levels, where targeting can prove more difficult.

Additionally, the multispectral imager may include a detector assembly including a detector array. The detector array, according to some example embodiments, may be a photodetector array and, more specifically, a focal plane array. The detector array may be configured to capture images for conversion into data for provision to processing circuitry for image calibration and analysis. The detector array may be configured to operate in both the visible and the infrared portions of the spectrum. Additionally, according to some example embodiments, the detector array may be temperature-controlled by a cooler to ensure that the spectral response of the detector array is not affected by changes in ambient temperature.

Further, the multispectral imager may also include processing circuitry. The processing circuitry may be configured to control the operation of the multispectral imager. More specifically, the processing circuitry may be configured to control the operation of the illumination assembly, the focusing assembly, and the detector assembly. In this regard, as further described in detail below, the processing circuitry may be configured to receive data from the detector array associated with the capture of a plurality of images of a scene at different focal points and different wavelengths to generate a multispectral image cube of a geologic scene. The processing circuitry may therefore control the multispectral imager to capture a plurality of images illuminated at a given wavelength at different focal points to generate, via z-stacking, a merged image of the scene at the given wavelength where each pixel of the merged image is in focus. The processing circuitry may perform this process of each of a number of wavelengths to generate a respective number of merged images for each wavelength. These merged images may be combined, for example, by the processing circuitry to form a multispectral image cube of the scene that can be analyzed. Analysis of the multispectral image cube may, for example, determine presence of elements and minerals in the scene based on the spectral profile of the multispectral image cube. The processing circuitry may also be temperature controlled via a dedicated cooler or heater. As such, due to the thermal considerations at the illumination array, the detector array, and the processing circuitry, the multispectral imager may be configured to operate in a wide temperature range from −100 C to +80 C.

As such, according to some example embodiments, a multispectral imager is provided that can combine high resolution microscopic imaging with visible/infrared reflectance microspectroscopy to generate spatially-correlated multispectral image cubes spanning from the visible to the infrared. Such images may be analyzed based on a multispectral profile to determine information about objects within a captured scene including compositional, mineralogic, organic, and microtextural information regarding a variety of materials, including rocks and soils, at the microscale.

Having described some example embodiments of a multispectral imager, FIG. 1 illustrates an application of a multispectral imager 20 according to a non-limiting, example embodiment in the context of a planetary rover 10. The planetary rover 10, according to some example embodiments, may be deployed on a planetary surface to perform a variety of tasks including geologic studies. As such, the planetary rover 10 may include a propulsion system 12, a control unit 14, a power system, and the multispectral imager 20.

The propulsion system 12 may include wheels, tracks, or the like that are driven by motors controlled by the control unit 14 and powered by the power unit. The power unit may include a battery 15 and a solar panel 16. The solar panel 16 may be configured to generate electricity for storage in the battery 15. The battery 15 may operate as the power source to the electronically-powered components of the planetary rover 10.

The multispectral imager 20 may be disposed at an end of a controllable arm 18. In this regard, the control unit 14 may control the movement of the arm 18 and the operation of the multispectral imager 20, with the assistance of processing circuitry of the multispectral imager 20. Depending on the imaging activity that is to be undertaken, the control unit 14 may position the controllable arm 18 and the multispectral imager 20 into position to capture a geologic scene 22. As further described herein, the multispectral imager 20 may be configured to image the geologic scene to generate a multispectral image cube for analysis to determine the elemental and mineral compositions of the objects in the geologic scene 22.

It will be understood by one of ordinary skill in the art that the application of the multispectral imager 20 is but one example application, and that various additional or alternative example embodiments of the multispectral imagers described herein may be utilized in a variety of contexts. In this regard, example embodiments described herein include fixed-position solutions such as with a tripod, lander, or other stationary device. Further, example embodiments of the multispectral imager described herein may be useful in hand held applications, as well as in laboratory applications.

With reference now to FIG. 2, a functional block diagram of a multispectral imager 100, according to some example embodiments, is shown. The multispectral imager 100 may be implemented as the multispectral imager 20 of the planetary rover 10 of FIG. 1, although additional or alternative example embodiments are not limited thereto. The multispectral imager 100 may include, according to some example embodiments, an illumination assembly 110, a focusing assembly 120, a detector assembly 130, and processing circuitry 140. An optical path for capturing an image of a scene may be defined by an optical aperture 101 and the optical path for the multispectral imager 100, which is indicated by the white arrows of FIG. 2 from externally originating (either from ambient light or reflected light from the illumination array 114), through the illumination assembly 110 and the focusing assembly 120, to a detector array 134 (which may be a photodetector array) of the detector assembly 130. In an example embodiment, the detector assembly 130 may be a photodetector assembly, although additional or alternative embodiments are not limited thereto. The optical aperture 101 may be a passage through which light may pass from an external scene into the multispectral imager 100 to the detector array 134 along the optical path. As the light along the optical path various components of the multispectral imager 100 may have an impact on the light to condition the light in preparation for being received by the detector array 134. The electrical or data path of the multispectral imager 100 is shown in FIG. 2 with dark shaded arrows proceeding from the detector assembly 130 to the processing circuitry 140, and possibly to an external device (not shown). As such, these dark shaded arrows indicate that the detector array 134 may be configured to covert the light received via the optical path into data for delivery to the processing circuitry 140 for image processing and analysis. As further described below, the processing circuitry 140 may also be configured to control various components of the illumination assembly 110, the focusing assembly 120, and the detector assembly 130 when performing a method or process for image capture.

The illumination assembly 110, which may include an aperture window 113 for protecting the optical elements in the focusing assembly 120, may be disposed at a forward end, e.g., an end closer to the optical aperture 101, of the multispectral imager 100 near or at the optical aperture 101. The illumination assembly 110 may be configured to control aspects of the illumination of a scene from external sources (e.g., sun or ambient light) and internal sources (e.g., an illumination array 114), as shown in FIG. 2 with the unshaded arrow emanating from the illumination array 114 toward the focusing assembly 120. As such, according to some example embodiments, the illumination assembly 110 may include a sun shield 112, the illumination array 114, and a temperature controller 116.

The sun shield 112 may be a cylindrical or conical-shaped structure that extends forward and away from the detector array 134 to limit an amount of light, such as ambient light, that enters the optical aperture 101 during an image capture. A length of the sun shield 112 may be related to a focal length of the detector array 134 in association with the focusing assembly 120. In this regard, according to some example embodiments, the sun shield 112 may have an adjustable length based on the illumination needs and focal point selected for a desired image capture. Additionally, the sun shield 112 may include concertinaed walls that may fold and expand to support the adjustability of the sun shield 112. As such, an actuator (e.g., an actuator 124) may be operably coupled to the sun shield 112 to control the length and thus the light permitted to enter the optical aperture 101. Further, a width and/or a diameter of the sun shield 112 may be based on a size or dimensions of the detector array 134, again in association with the impacts of the focusing assembly 120. The internal passage of the sun shield 112 (forming a portion of the optical path) may be formed or coated with a light absorbing material, for example, to reduce internal reflections and non-parallel wave modes. In this regard, the internal passage of the sun shield 112 may operate to impact light entering the optical aperture 101, as well as light leaving the optical aperture 101 from the illumination array 114. According to some example embodiments, the sun shield 112 may also include a re-closable cover to protect the elements within the illumination assembly 110 from dust and other particles when the multispectral imager 100 is not in use. The internal face of the cover of the sun shield 112 may also be coated with a coating of known reflectance (e.g., 20%, 50%, 99% reflectance, etc.) to enable regular internal calibration of the multispectral imager 100.

The illumination assembly 110 may also include the illumination array 114 configured to, for example, controllably output illumination at a selected wavelength of a plurality of potential wavelengths that may be output by the illumination array 114. In this regard, the illumination array 114 may be configured to output light or illumination in the visible and short-wave infrared spectrum (e.g., at wavelengths from about 0.45 microns to about 2.6 microns and expandable to about 3.6 microns or about 4 microns). The illumination array 114 may also be configured to output light or illumination in the ultraviolet spectrum (e.g., at wavelengths from about 0.25 microns to about 0.4 microns) to enable fluorescence imaging. According to some example embodiments, through control of the illumination array 114, more than twenty-five discrete wavelengths may be output with a full width half maximum (FWHM) of fifty nanometers or less. Use of the illumination array 114 may permit the multispectral imager 100 to operate in both ambient illuminated or dark environments. As described in further detail below, the illumination array 114 may be include a plurality of illumination elements (also referred to as illuminating elements) that may be positioned to support uniform illumination of selected wavelengths across the scene. According to some example embodiments, each illuminating element may include a multispectral light emitting diode (LED) and a bandpass filter. As further described below, each of the illuminating elements may be controllable output light at one or more wavelengths. As such, according to some example embodiments, the illuminating elements may be multispectral elements. Additionally, the illumination array 114 may also include illuminating elements (e.g., LEDs) configured to output light at ultraviolet wavelength to enable fluorescence imaging. In this regard, the illuminating elements may include, for example a 0.36 micron LED, to enable fluorescence imaging, where the bands from 0.4 to 2.6 microns or higher may be used for reflectance imaging.

Further, each illuminating element may be separately controllable by the processing circuitry 140, thereby facilitating an ability to control the wavelength output of the illumination array 114 by controlling the operation of the illuminating elements. In this regard, the illuminating elements may be divided into groups, where each illumination element in a group is controlled to output the same wavelength of light. In this manner, a variety of wavelengths of light may be generated and output at uniform intensity by controlling the illumination elements arranged around an optical path of the multispectral imager 100. In this regard, the illumination array 114 may be disposed around the aperture window 113 such that the illumination array 114 operates to illuminate a target scene in a uniform manner by controlling the illumination to be symmetrical about the optical path and the aperture window 113. The light generated by the illumination array 114 may be controlled by the processing circuitry 140 such that the light is provided at a selected wavelength. The light generated by the illumination array 114 may be reflected back from the scene and pass through optical path which, according to some example embodiments, is centrally located to the illumination array 114. In this regard, according to some example embodiments, the illumination array 114 may be disposed around or encircle the optical path.

According to some example embodiments, the illumination assembly 110 may also include a temperature controller 116. The temperature controller 116 may be a thermal transfer device, composed of heating and cooling elements, configured to maintain the illumination array 114 within a defined temperature range. In some instances, the wavelength output of an illumination element may be temperature dependent. As such, when the temperature of the illumination elements vary outside of the defined temperature range, the wavelength may be also change, thereby affecting the illumination wavelength and the images captured that are intended to be illuminated at a selected wavelength. Accordingly, the temperature controller 116 may include or be associated with a temperature sensor that can be used to monitor a temperature of the illumination array 114. The temperature sensor may be monitored by the processing circuitry 140. The processing circuitry 140 may also be configured to control the operation of the temperature controller 116 in response to the monitored temperature of the illumination array 114 being outside of the temperature range for the illumination array 114. The processing circuitry 140 may therefore be configured to control the operation of the temperature controller 116 to respond to the temperature of the illumination array 114 if the temperature of the illumination array 114 either exceeds a high temperature threshold or falls below a low temperature threshold. Although the illumination array 114 is designed to operate over a similar temperature range as the multispectral imager 100, according to some example embodiments, the illumination array 114 may be thermally maintained over a narrower temperature range, e.g., from about 0 C to about +30 C, with a nominal operating temperature of about +20 C, to minimize any shift in the wavelength output of the illumination element due to changes in ambient temperature. According to some example embodiments, the temperature controller 116 may be a thermoelectric cooler device. In this regard, the temperature controller 116, as a thermoelectric cooler, may be configured to maintain the illuminating elements of the illumination array 114 within a predetermined, defined temperature band to prevent temperature-induced wavelength shifting of the light being output by the illuminating elements.

As mentioned above, the multispectral imager 100 may also include a focusing assembly 120. Light that enters the optical aperture 101, and is reflected from a scene, may travel through the illumination assembly 110 to the focusing assembly 120 to be focused in a controlled, adjustable manner. In this regard, focusing assembly 120 may include at least one lens 122 that may operate to focus the light received into the focusing assembly 120. The lens 122 may be configured to focus light to support both microscopic and macroscopic imagery. According to some example embodiments, the focusing assembly 120 may be configured to permit the multispectral imager 100 to achieve a spatial resolution less than or equal to 20 or 30 microns per pixel at the detector array 134 (described further below) with a field of view of, for example, greater than or equal to two by two centimeters. In this regard, the lens 122 may be movable in parallel with the optical path either toward the detector array 134 or away from the detector array 134 to move a focal point of the multispectral imager 100. In addition to the lens 122, the focusing assembly 120 may also include other movable optics configured to facilitate a focusing function of the multispectral imager 100. To allow the multispectral imager 100 to operate both as a microscopic imager and a targeting view-finder at the macroscopic level, an actuator 124 may be configured to physically move the lens 122 within the optical path. The actuator 124 may be controlled by the processing circuitry 140 to adjust the focus point of the multispectral imager 100 by controlling the actuator 124 and thus the lens 122. According to some example embodiments, the actuator 124 may be a servo or a motor (e.g., stepper motor). The actuator 124 may include or be connected to mechanics, for example, including a threaded arm, linear bearing, or the like that may be operably coupled to the lens 122 such that rotational movement of the actuator 124 may be converted into sliding to translational movement of the lens 122 within the optical path. According to some example embodiments, as further described below, the processing circuitry 140 may be configured to control the operation of the actuator 124 to change the focal point of the multispectral imager 100 during a series of image captures of the same scene in order to obtain images of the scene that can be later calibrated and merged to generate a multiple-focal point image where each of the objects within the image are in focus.

Additionally, the focusing assembly 120 may include a filter wheel 126. The filter wheel 126 may be a device with a number different filter windows that have different filtering effects. The filter wheel 126 may be a moveable device that rotates to bring a selected filter window into the optical path to have a desired effect on the light traveling through the optical path. The filter wheel 126 may be positioned either forward or behind the lens 122, as shown in FIG. 2. To rotate a selected filter window into the optical path, the filter wheel 126 may also be operably coupled to actuator 124 to control the rotation of the filter wheel 126. In this regard, according to some example embodiments, the actuator 124 may control the movement of the lens 122, the filter wheel 126, and the sun shield 112 via various gearing or selectable engagements between the actuator 124. However, in some example embodiments, the filter wheel 126, lens 122, and sun shield 112 may be separately coupled to respective actuators to be separately controlled by, for example, the processing circuitry 140.

The windows of the filter wheel 126 may be configured to permit the multispectral imager 100 to operate in a panchromatic mode. According to some example embodiments, the filter wheel 126 may include a one or more filter windows that are configured to pass light in a visible band or ambient light wavelengths to the detector array 134 and one or more windows that are configured to pass light in an infrared band to the detector array 134. These filter windows may be employed when the multispectral imager 100 is performing targeting view-finder operations at the macroscopic levels (e.g., distances from a few centimeters to infinity). When the filter wheel is employed in this manner, according to some example embodiments, the illumination assembly 110 may be controlled to provide no local illumination. Additionally, the filter wheel 126 may include at least one other filter window that is configured to pass, for example, select infrared wavelengths for use with the illumination assembly 110 providing illumination, for example, in a microscopic operational mode to capture images focused at a few centimeters or less. As such, according to some example embodiments, the second filter window may be utilized during imaging operations where an infrared wavelength is being targeted of imaging (e.g., due to selective control of the illumination array 114).

According to some example embodiments, the multispectral imager 100 may also include a detector assembly 130. The detector assembly 130 may be configured to receive the light that has propagated through the optical path and convert the light into data, representative of the light, to form a digital image. In this regard, the detector assembly 130 may include a filter 132 and a detector array 134. The filter 132 may be a final conditioning optical filter in the optical path in front of the detector array 134. According to some example embodiments, the filter 132 may be cold filter that is configured to, for example, remove light at wavelengths that are not of interest for imaging and would otherwise create additional noise in the light or optical signal received at the detector array 134.

The detector array 134 may be disposed at a terminating end of the optical path. In this regard, the detector array 134 may be any type of imaging device that is configured to operate in both the visual and infrared spectrum. In this regard, detector array 134 may be configured to operate in the visual and short-wave infrared reflectance spectrum (e.g., wavelengths of 0.45 to 2.6 microns and expandable to 3.6 or 4 microns). Further the detector array 134 may be a focal plane array, such as a mercury cadmium telluride (MCT) detector focal plane array. Other detector embodiments may include indium gallium arsenide (InGaAs), lead selenide (PbSe), or indium antimonide (InSb) detectors. According to some example embodiments, the detector array 134 may include a dewar configured to assist with temperature control of the detector array 134.

The detector array 134 may be include a number of array elements that can individually capture a pixel component of an image. According to some example embodiments, the detector array 134 may be a 1024 by 1024 pixel array. Additionally, the detector array 134, in coordination with the other components, may be configured to operate the multispectral imager 100 with a signal-to-noise ratio of greater than or less than 100.

As further described below, the processing circuitry 140 may be configured to control the operation of the detector array 134 to capture images in association with controlling the illumination assembly 110 and the focusing assembly 120. In addition to controlling the detector array 134 to capture an image and settings associated with capturing an image, the processing circuitry 140 may also be configured to receive the captured image as data from the detector array 134 for image processing and analysis.

According to some example embodiments, the detector assembly 130 may also include a detector cooler 138. The detector cooler 138 may be any type of thermal transfer device (such as a cryocooler) configured to maintain the detector array 134 within a defined temperature range. In some instances, the response of the detector array 134 may be temperature dependent with dark noise increasing with temperature. As such, when the temperature of the detector array 134 varies outside of a defined temperature range, the detector array 134 response may also change, thereby affecting the quality of the images captured at a selected wavelength. Accordingly, the detector cooler 138 may include, or be associated with, a temperature sensor that can be used to monitor a temperature of the detector array 134. The temperature sensor may be monitored by the processing circuitry 140, and the processing circuitry 140 may be configured to control the detector cooler 138 in response to the monitored temperature of the detector array 134 being outside of the temperature range for the detector array 134. The processing circuitry 140 may therefore be configured to control the operation of the detector cooler 138 to either cool or warm the detector array 134, if the temperature of the detector array 134 either exceeds a high temperature threshold for the detector array 134 or falls below a low temperature threshold for the detector array 134. According to some example embodiments, the detector cooler 138 may be a cryocooler device embedded in a wax pack.

As mentioned above, the processing circuitry 140 may also be a component of the multispectral imager 100. According to some example embodiments, the processing circuitry 140 may be housed at the multispectral imager 100 or the processing circuitry 140 may be housed elsewhere, such as in a data processing unit (DPU), but be in communication with the assemblies of the multispectral imager 100 for control, image capture, and image processing. In this regard, according to some example embodiments, the illumination assembly 110, the focusing assembly 120, and the detector assembly 130 may form imager or sensor head and the processing circuitry 140 may be disposed separately or remote from the sensor head such as in a DPU.

Accordingly, the processing circuitry 140 is configurable to perform actions in accordance with example embodiments described herein. As such, for example, at least some of the functions attributable to the multispectral imager 100 may be carried out by or otherwise instructed by the processing circuitry 140. The processing circuitry 140 may therefore provide the hardware for implementing, for example, software to configure the multispectral imager 100 for operational techniques consistent with example embodiments for control of the multispectral imager 100 and the processing of images captured by the detector array 134. In this regard, the processing circuitry 140 may be configured to receive raw image data from the detector array 134 and perform various types of processing on the data, for example, to generate a processed image for analysis.

The processing circuitry 140 may be configured to perform data processing, control function execution and/or other processing and management services according to some example embodiments. In some embodiments, the processing circuitry 140 may be embodied as a chip or chip set. In other words, the processing circuitry 140 may include one or more physical packages (e.g., chips) including materials, components and/or wires on a structural assembly (e.g., a baseboard). In some example embodiments, the processing circuitry 140 may include one or more instances of a processor and memory 146 that may be in communication with or otherwise control an input/output (I/O) interface 142. As such, the processing circuitry 140 may be embodied as one or more instances of a circuit chip (e.g., an integrated circuit chip) configured (e.g., with hardware, software or a combination of hardware and software) to perform operations described herein.

The I/O interface 142 may include one or more interface mechanisms for enabling communication with other external devices (e.g., output devices, input devices and/or the like) or internal functional components and assemblies of the multispectral imager 100. In some cases, the I/O interface 142 may be any means such as a device or circuitry embodied in either hardware, or a combination of hardware and software that is configured to receive and/or transmit data from/to devices in communication with the processing circuitry 140.

In an exemplary embodiment, the memory 146 may include one or more non-transitory memory devices such as, for example, volatile and/or non-volatile memory that may be either fixed or removable. The memory 146 may be configured to store information, data, applications, instructions or the like for enabling the multispectral imager 100 to carry out various functions in accordance with example embodiments. For example, the memory 146 could be configured to buffer input data (e.g., image data) for processing by the processor 144. Additionally or alternatively, the memory 146 could be configured to store instructions for execution by the processor 144. As yet another alternative or additional feature, the memory 146 may include one or more databases that may store a variety of data sets indicative of patterns that are configured to trigger specific responses or algorithms, image data processing techniques, processing algorithms and/or the like to be employed for the execution. Among the contents of the memory 146, applications may be stored for execution by the processor 144 in order to carry out the functionality associated with each respective application. In some cases, the applications may include directions for control of the multispectral imager 100 to control operation of the assemblies and process images. In particular, in some cases, the applications may include instructions for directing operation of multispectral imager 100. In some cases, the applications may further include directions for generating outputs as collections and processed combinations of images.

The processor 144 may be embodied in a number of different ways. For example, the processor 144 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 144 may be configured to execute instructions stored in the memory 146 or otherwise accessible to the processor 144. As such, whether configured by hardware or by a combination of hardware and software, the processor 144 may represent an entity (e.g., physically embodied in circuitry in the form of processing circuitry 140) capable of performing operations according to example embodiments described herein while configured accordingly. Thus, for example, when the processor 144 is embodied as an ASIC, FPGA or the like, the processor 144 may be specifically configured hardware for conducting the operations described herein. Alternatively, as another example, when the processor 144 is embodied as an executor of software instructions, the instructions may specifically configure the processor 144 to perform the operations described herein.

In an example embodiment, the processor 144 (or the processing circuitry 140) may be embodied as, include or otherwise control the multispectral imager 100. As such, in some embodiments, the processor 144 (or the processing circuitry 140) may be said to cause each of the operations described in connection with the multispectral imager 100 by directing the assemblies (i.e., the illumination assembly 110, the focusing assembly 120, and the detector assembly 130) to undertake the corresponding functionalities responsive to execution of instructions or algorithms configuring the processor 144 (or processing circuitry 140) accordingly.

According to some example embodiments, the processing circuitry 140 may also include a cooler. The cooler may be a thermal transfer device configured to maintain the processing circuitry 140, and more specifically the processor 144, within a defined temperature range for proper operation and to avoid damaging the processing circuitry 140 due to overheating. Accordingly, the cooler may include or be associated with a temperature sensor that can be used to monitor a temperature of the processing circuitry 140. The temperature sensor may be monitored by the processing circuitry 140, and the processing circuitry 140 may be configured to control the cooler in response to the monitored temperature being outside of the temperature range. The processing circuitry 140 may therefore be configured to control the operation of the cooler if the temperature of the processing circuitry 140 exceeds a high temperature threshold or falls below a low temperature threshold. According to some example embodiments, the cooler may be a cryocooler device embedded in a wax pack.

As further described with respect to FIGS. 8 to 10, the processing circuitry 140 may be configured to control the operation of various components of the multispectral imager 100 to capture images of a scene (e.g., a geologic scene). More specifically, according to some example embodiments, the processing circuitry 140 may be configured to capture a series of images of the scene at a selected wavelength that is output by the illumination assembly 110, under the control of the processing circuitry 140, and at different focal points (or focal lengths) as controlled by the movement of the lens 122 of the focusing assembly 120. The processing circuitry 140 may be configured to merge the series of images for the selected wavelength into a merged image where each pixel of the merged image is in focus. The processing circuitry 140 may be configured to capture additional series of images at other wavelengths and generate respective merged images for those wavelengths. The processing circuitry 140 may also be configured to combine the merged images into a multispectral image cube of the scene, which may be analyzed to determine compositional information about objects within the scene. Additional descriptions of processes for generating and analyzing a multispectral image cube, according to some example embodiments, are provided below.

According to some example embodiments, the processing circuitry 140 may be embodied as a single processing unit or the processing circuitry 140 may be separate components that are dedicated for control of specific ones of the assemblies. In this regard, for example, the illumination assembly 110, focusing assembly 120, and the detector assembly 130 may each have dedicated or shared processing circuitry configured to control their respective operation as described herein. Additionally, according to some example embodiments, image processing as described herein may be performed by separate and remote processing circuitry.

Having described various components and functionalities of the multispectral imager 100, another example embodiment of a multispectral imager 300 will now be described with reference to FIGS. 3A and 3B. In this regard, FIG. 3A is a perspective side view of some external components of the multispectral imager 300 and FIG. 3B is a partial perspective side view of the multispectral imager 300 to reveal some internal components of the multispectral imager 300.

With reference to FIG. 3A, the external components and housings are illustrated. In this regard, the multispectral imager 300 may include a sun shield 312. The sun shield 312 may be same or similar to the sun shield 112 described above. The sun shield 312 may be disposed at a forward end, e.g., an incoming end, of the optical path 302 of the multispectral imager 300 and may define the optical aperture 301 for the multispectral imager 300. As shown in FIG. 3A, the optical path 302 extends from the forward end of the multispectral imager 300, e.g., from the sun shield 312, and into the multispectral imager 300 to a detector array 334 (FIG. 3B), which in an example embodiment may be a photodetector array.

The sun shield 312 may be cylindrically-shaped and may be affixed via a flange to a cylindrically-shaped optical housing 303. The optical housing 303 may house an illumination assembly, a focusing assembly, and some of the components of a detector assembly (including a detector array). The optical housing 303 may enclose the illumination assembly, a focusing assembly, and some of the components of a detector assembly (including a detector array) to protect these components from environmental conditions such as moisture, dirt, dust, and the like. The optical path 302, which may continue into the optical housing 303, may terminate at the detector array within the optical housing 303. According to some example embodiments, the multispectral imager 300 may also include a circuitry housing 304. In this regard, the circuitry housing 304 may house processing circuitry (e.g., the processing circuitry 140 shown in FIG. 2). Similarly, the circuitry housing 304 may operate to protect the internal components of the processing circuitry from the external environment and any environmental effects.

With respect to dimensional aspects of an example embodiment of the multispectral imager 300, a length of the multispectral imager 300 from the forward end of the sun shield 312 (e.g., in a fully extended position) to the rear end of the circuitry housing 304 may be about 11.5 inches. The diameter of the sun shield 312, at a forward end of the sun shield 312, across a forward aperture ring may be about 4.5 inches. The diameter of the optical housing 303 may be about 4 inches. A height of the circuitry housing 304 may be about 5.6 inches and a width of the circuitry housing may also be about 5.6 inches. Alternative example embodiments may include the exact dimensions listed above.

Referring now to FIG. 3B, various internal components of the multispectral imager 300 will be described, and are the same or similar to various components of the multispectral imager 100 described above with regard to FIG. 2. In this regard, the multispectral imager 300 may include an illumination assembly 310, a focusing assembly 320, a detector assembly 330, and processing circuitry 340. As such, according to some example embodiments, the illumination assembly 310 may perform the same or similar functionalities and be structured in the same or similar manner as the illumination assembly 110. Further, according to some example embodiments, the focusing assembly 320 may perform the same or similar functionalities and be structured in the same or similar manner as the focusing assembly 120. Additionally, according to some example embodiments, the detector assembly 330 may perform the same or similar functionalities and be structured in the same or similar manner as the detector assembly 130. According to some example embodiments, the processing circuitry 340 may perform the same or similar functionalities and be structured in the same or similar manner as the processing circuitry 140.

As described above with respect to FIG. 3A, the multispectral imager 300 may include the sun shield 312, which may be a component of the illumination assembly 310. Additionally, the illumination assembly 310 may include an illumination array 314. As shown in FIG. 3B, the illumination array 314 may be formed of collection of illumination element segments 315 that are disposed around the optical path 302 and an aperture window 313, which is disposed in the center of the illumination array 314. Each illumination element segment 315 may include an associated plurality of illumination elements, e.g., illuminating elements, described in greater detail below with respect to FIGS. 4 and 5, where each illumination element is configured to output a number of wavelengths of light for illumination of a scene. Additionally, because each illumination element may be include a respective bandpass filter, the wavelength output by an illumination element may be within a very narrow band, thereby providing for illumination at discrete wavelengths. The illumination element segments 315 may, according to some example embodiments, be angled (e.g., tilted) toward a center of the optical path 302) to direct the illumination towards a scene to be imaged. Additionally, because the illumination element segments 315 and the illumination elements are disposed around the optical path 302, the intensity of the illumination provided by the illumination elements is uniform across the scene to avoid bright or dim spots or the introduction of other illumination-related errors that may affect the quality of an image capture by non-uniform illumination. The internal surfaces of the sun shield 312 may also contribute to the uniform illumination of the scene with respect to intensity as described above. In this regard, because of the uniformity of the illumination and the discrete wavelengths that are capable of being provided by the illumination array 314, spectral artifacts can be reduced or eliminated from captured images.

The focusing assembly 320 may include a lens 322, an actuator 324, and a filter wheel 326. As described above with respect to the lens 122 (FIG. 2), the lens 322 may be physically movable to change a focal point of the multispectral imager 300 to transition the multispectral imager 300 between focus points in both a microscopic or macroscopic operating mode. As shown in FIG. 3B, the actuator 324 may be a stepper motor that includes an arm 325 that is coupled to the lens 322. In this regard, the stepper motor may be controlled by the processing circuitry 340 and configured to move the lens 322 to adjust a focal point for or of the multispectral imager 300. For example, via threading or a track, an engagement member coupled to the arm 325 may cause the lens 322 to move along the optical path 302 when the actuator 324 moves. By moving the lens 322 in this manner the magnification and focal point of the multispectral imager 300 may be changed.

Additionally, the filter wheel 326, which may function and be structured similar to the filter wheel 126 (FIG. 2), may include a plurality of windows 327 that can be rotated into the optical path 302. As shown in FIG. 3B, two of the windows, i.e., windows 327a and 327b that are not currently positioned in the optical path 302, are shown. In this regard, the actuator 324 may be used to controllably drive rotation of the filter wheel 326 to place a selected window into the optical path 302, e.g., to rotate window 327a or window 327b into the into the optical path 302, etc.

The detector assembly 330 may include a detector array 334, which may be housed inside a flask, such as a dewar, and thermally connected to a detector cooler 348 via a cold trap device, such as a cold finger (not shown). The detector array 334 may function and be structured in the same or a similar manner as the detector array 134. As shown in FIG. 3B, the detector array 334 may be disposed behind the focusing assembly 320 in the optical path 302. In this regard, the detector array 334 may be configured to receive light reflected from a scene that is propagating along the optical path 302 and convert the received light into data as a digital image.

Additionally, the processing circuitry 340 may include the detector cooler 348 to maintain the detector array 334 within an operational temperature range. In this regard, the detector cooler 348 may function and be structured in the same or a similar manner as the detector cooler 138 of multispectral imager 100 (FIG. 2). As such, according to some example embodiments, the detector cooler 348 may be a cryocooler, which may be configured to provide cooling of the detector array 334 at cryogenic temperatures. In this regard, the detector cooler 348 may be disposed adjacent to the detector array 334, via a cold finger, to facilitate thermal transfer between the detector cooler 348 and the detector array 334 to maintain the detector array 334 within the operating temperature range.

Referring now to FIGS. 4 to 6, further description of additional example embodiments of the illumination array shown in FIGS. 2 and 3B is provided. In this regard, with reference to FIG. 4, an illumination array 400 is shown. Specifically, a front view of the illumination array 400 is provided in FIG. 4, looking into the optical aperture 401 of the multispectral imager 100 (FIG. 2) or the multispectral imager 300 (FIGS. 3A and 3B).

As illustrated, the illumination array 400 may be include a plurality of illumination element segments 405. Each illumination element segment 405 may, in turn, include a plurality of illumination elements 410 (also referred to as illuminating elements 410). The illumination element segments 405 may be separable or formed as an integrated unit for assembly into a multispectral imager 300, for example. The illumination elements 410 may be disposed on the illumination element segments 405 such that the illumination elements 410 are arranged radially about the optical aperture 401 and the optical path of a multispectral imager.

According to some example embodiments, the illumination elements 410 may be grouped by wavelengths of light that the illumination elements 410 are configured to output. In this regard, according to some example embodiments, each radial row of illumination elements 410 may form a group of illumination elements 410. According to some example embodiments, the illumination elements 410 may be arranged in a radial grid or collections of illumination elements 410 (e.g., smaller rectangular grids) may be arranged in a radial grid. By arranging the illumination elements 410 in radial rows according to wavelength, the illumination array 400 provides uniform illumination at each wavelength option offered by the illumination array 400. As such, in the example embodiment of the illumination array 400 shown in FIG. 4, the illumination array 400 includes four radial rows and each of these rows may form a respective group of illumination elements 410. For non-limiting explanation purposes, portions of the radial rows of two illumination element segments 405 have been highlighted in FIG. 4. Specifically, a first portion 420 of a first radial row may include illumination elements 410 configured to output, for example, controllable infrared wavelengths of light for scene illumination. A second portion 422 of a second radial row may include illumination elements 410 that may also be configured to output, for example, controllable infrared wavelengths of light for scene illumination. A third portion 424 of a third radial row may include illumination elements 410 may also be configured to output, for example, controllable ultraviolet wavelengths of light for scene illumination. And finally, a fourth portion 426 of a fourth radial row may include illumination elements 410 configured to output, for example, visible wavelengths of light for scene illumination.

According to some example embodiments, each illumination element 410 may be separately controllable by, for example, the processing circuitry 140 (FIG. 2) or the processing circuitry 340 (FIG. 3B). Further, each illumination element 410 may be separately connected for independent control to provide redundancy in an event of a failure of one of the illuminating elements 410. As such, the processing circuitry may be configured to generate each of the wavelengths of illuminating light offered by the illumination array 400 by controlling each of the illumination elements 410. Although in some instances, the illumination elements 410 may be controlled differently from their respective group, generally, illumination elements 410 may be controlled together with their respective group (e.g., a visible group, an infrared group, an ultraviolet group, or the like), despite being individually addressable. In some instances, to generate a desired wavelength of light for illumination more than one group of illumination elements 410 may be illuminated at selected wavelengths.

As mentioned above, in operation, the illumination array 400 may be controlled to output illumination at a plurality of different wavelengths via control of the illumination elements 410. As such, according to some example embodiments, the illumination array 400, with the assistance of collimator structures and filter structures for the illumination elements described below, may be configured to output over 25 different and discrete wavelengths at various intensities with uniform distribution. For example, the illumination array 400 may be configured to output the following wavelengths: 365 nanometers (nm), 450 nm, 530 nm, 630 nm, 750 nm, 860 nm, 900 nm, 950 nm, 1000 nm, 1050 nm, 1100 nm, 1250 nm, 1300 nm, 1430 nm, 1520 nm, 1650 nm, 1780 nm, 1910 nm, 2000 nm, 2080 nm, 2210 nm, 2250 nm, 2300 nm, 2350 nm, 2400 nm, 2520 nm, and 2600 nm. This may be adjusted to expand the spectral range to 3.6 or 4 microns and wavelengths may be added/subtracted depending on the application.

Referring now to FIG. 5, another example embodiment of an illumination array 500 is provided. The illumination array 500 includes eight illumination element segments 502 inside four illumination array panels 505. As shown in FIG. 5, the illumination element segments 502 of the illumination array 500 may be arranged around an optical aperture 501. In this regard, a front view of the illumination array 500 is provided in FIG. 5, looking into the optical aperture 501 of a multispectral imager, for example, the multispectral imager 100 (FIG. 2) or the multispectral imager 300 (FIGS. 3A and 3B), although alternative example embodiments are not limited thereto.

The illumination element segments 502 are arranged radially around the optical aperture 501, for example, to provide for uniform illumination of a scene with respect to intensity across the scene. Each illumination element segment 502 may include a plurality of illumination elements 503 (also referred to as illuminating elements), connection traces 504, and connection points 506.

Each illumination element 503 may be individually electrically connected to one or more connection traces 504. In this regard, the connection traces 504 may be conductive elements that electrically connect between the illumination element 503 and the connection points 506. The connection traces 504 may be configured to place each illumination element 503 in a respective circuit to, for example, provide a voltage to power the respective illumination element 503. The connection traces 504 may be electrically connected to a respective connection point 506. The connection points 506 may provide a location where interconnection with other components of a multispectral imager may be formed. According to some example embodiments, the connection points 506 may be available on a back side of the illumination element segment 502. In this regard, for example, the connection points 506 may be the locations where an electrical connection to processing circuitry, such as processing circuitry 140, may be formed to permit the processing circuitry to control the operation of the illumination elements 503.

Now referring to FIG. 6, a cross-sectional view of an example architecture of two illumination elements 600 is shown. The illumination elements 600 may be constructed on a printed wire board (PWB) or a printed circuit board (PCB) substrate 604. According to some example embodiments, the substrate 604 may be formed of, for example, a polyimide material. On a top surface of the substrate 604, pads 620 and traces 622 may be formed to facilitate electrical connections. Although not shown in FIG. 6, the pads 620 and traces 622 extend to connection points for electrical connection to other components (e.g., the processing circuitry 140 or 340). In this regard, an emitter 612 may be placed on, and electrically connected to, a pad 620. The pad 620 may be a thermally conductive pad configured to have a high thermal transfer rate to facilitate thermal control of the emitter 612. The emitter 612 may be configured to output light of one of plurality of wavelengths when controlled and powered. According to some example embodiments, the emitter 612 may be a multispectral LED. In this regard, the emitter 612 may be configured to output a wavelength of light based on how the emitter 612 is controlled (e.g., based on the voltage applied to the emitter 612). In example embodiments where the emitter 612 is a multispectral device (e.g., a multispectral LED), the emitter 612 may be controlled to output a desired wavelength as controlled by, for example, the processing circuitry 140 or 340. The emitter 612 may be a two terminal device and therefore a wire 616 may be used to connect a terminal of the emitter 612 to the trace 622. Via these connections, the emitter 612 may be controlled to be in an illuminating state ("on") where the emitter is outputting light at one of a number of wavelengths for the emitter 612, or in an inactive or non-illuminating state ("off").

The emitter 612 may be disposed at the base of a cavity formed by a collimator structure 606 and a filter structure 608. According to some example embodiments, a depth of the cavity formed by the collimator structure 606 and a filter structure 608 may be about 3 millimeters (or exactly 3 millimeters in another example embodiment). As shown in FIG. 6, the emitters 612 may be disposed in respective cavities and may be separated by a distance of, for example, about 2 millimeters (or exactly 2 millimeters in another example embodiment). Via operation of the collimator structure 606, the filter structure 608, and the proximity of the emitters 612 to each other, angles between the different illumination wavelengths outputted by the emitters 612 may be minimized. Additionally, emitters 612, in the absence of the collimator structure 606 and the filter structure 608, may output light at a relatively wide band (e.g., from about 100 nanometers to 300 nanometers FWHM), particularly in the infrared. Such a wide band may be too wide for compositional detection of spectral features. As such, the collimator structure 606 and the filter structure 608 may operate to reduce the band and create discrete wavelengths with narrow-bandpasses (e.g., less than about 50 nanometers), which can be used to resolve spectral features from about 1.0 microns to about 2.6 microns for detecting a variety of minerals and materials.

In this regard, the collimator structure 606 may operate as a lower spacer to form a lower portion of a cavity in which the emitter 612 is disposed. In addition to collimating the light output by the emitter 612 to desired illumination angles, the collimator structure 606 may protect the emitter 612 from, for example, physical damage. The collimator structure 606 may include a collimating aperture 630 configured to channel the light emitted by the emitter 612 through the collimating aperture 630. The collimator structure 606 may be disposed (e.g., mounted) on the traces 622 or directly on the substrate 604 as a plate with the cavities for the emitters 612 being formed by holes in the plate. The collimator structure 606 may also be formed of a polyimide material. According to some example embodiments, a width or diameter of the cavity formed by the collimator structure 606 may be about 1.5 millimeters (or exactly 1.5 millimeters).

As mentioned above, the illumination element 600 may also include a filter structure 608 that, according to some example embodiments, is configured to serve for mounting or supporting a narrow-bandpass filter 609. In this regard, the filter structure 608 may also be formed of a polyimide material. The filter structure 608 may be disposed or mounted on and above the collimator structure 606, and may also take the form of a plate with respective openings to form a cavities for the emitters 612. As such, the filter structure 608 may add to the depth or height of the cavity formed by the collimator structure 606 and the filter structure 608. The filter structure 608 may include a filter aperture 632 aligned with the collimating aperture 630. The filter aperture 632 may be configured to pass light at a band including a selected wavelength and filter light at wavelengths outside of the band. However, the filter structure 608 may have a different width or diameter, relative to the width or diameter of the cavity formed by the collimator structure 606. According to some example embodiments, the width or diameter of the channel formed by the filter structure 608 may be less than the width or diameter of the cavity formed by the collimator structure 606 and the width or diameter of the narrow-bandpass filter 609. For example, the width (e.g., diameter) 610 of the channel formed by the filter structure 608 may be about 1.0 millimeter. In this regard, the width or diameter 610 of the channel formed by the filter structure 608 may be defined in accordance with the wavelengths of light that the emitter 612 is configured to output. As such, the width or diameter of the channel, indicated in FIG. 6 as length 610, may cause the filter structure 608 to control the emission angles of the light emitted from the emitter 612 that is transmitted through the narrow-bandpass filter 609. In this regard, according to some example embodiments, the narrow-bandpass filter 609 consists of optical material, such as a glass substrate with filter-specific coatings, and may tighten or reduce the variation in the wavelength of light being output by the emitter 612 to a narrower band, which operates to illuminate a scene at a discrete wavelength.

Now referring to FIG. 7, a detector array 700 according to an example embodiment is shown. The detector array 700 may be configured to operate and be structured in the same or similar manner as the detector array 134 (FIG. 2) or the detector array 334 (FIG. 3B) described in greater detail above. In this regard, the detector array 700 may take the form of a focal plane array, such as a mercury cadmium telluride (MCT) detector focal plane array. The detector array 700 may have a planar surface that is populated with a plurality of detector elements 702. The detector elements 702 may be disposed in a grid configuration. Each of the detector elements 702 may operate as a pixel of the detector array 700 to receive a pixel-sized portion of a captured scene. The detector array 700 is merely provided as a conceptual example of, in the example shown in FIG. 7, a seven by six array. However, it is understood that any number and arrangement of detector elements 702 may be included in the detector array 700. According to alternative example embodiments, the detector array 700 may include, for example, a 1024 by 1024 array of the detector elements 702. Regardless of the number and arrangement of the detector elements 702, each detector element 702 may be configured to receive light and convert characteristics of the received light (e.g., including spectral characteristics) into electrical signals in the form of data for delivery to, for example, processing circuitry 140 or 340.

Having described the structure and functionalities of various components of example embodiments of a multispectral imager provided herein, FIGS. 8 to 10 will now be described which illustrate, among other things, example processes and methods for compiling captured images and forming a multispectral image cube of a scene using a multispectral imager, such as the multispectral imager 100 (FIG. 2) or 300 (FIG. 3B). As such, the example block process/flow diagram 800 of FIG. 8 will be described with respect to the multispectral imager 100, although other example embodiments of a multispectral imager may be used to implement the process 800. In this regard, FIG. 8 will be first described to illustrate one example approach for capturing various series of images and combining those images in various manners to generate a multispectral image cube of a scene. According to some example embodiments, the operations and functionalities described with respect to FIG. 8 may be performed by processing circuitry, such as, processing circuitry 140 (FIG. 2) or 340 (FIG. 3B). As such, according to some example embodiments, the processing circuitry may be configured to perform these functionalities and operations. For ease of the following description of FIGS. 8 to 10, only the associated components of the multispectral imager 100 shown in FIG. 2 will be described, except as where specifically noted (e.g., by specific reference to the multispectral imager 300 shown FIG. 3B), but it will be understood that alternative example embodiments are not limited to any particular component shown in a given figure.

In general, the example process 800 includes the capturing pluralities of images of a single scene at different wavelengths and/or at different focal points, and images of this these pluralities of images may be used as the inputs to the process to ultimately generate a calibrated, multispectral image cube of the scene for compositional analyses. In this regard, images in the form of a stack layer, as further described below, may be generated for a selected first wavelength; that is, a first plurality of images at the selected first wavelength is generated, and each image of the first plurality of images is generated at a respective, different focal point of the multispectral imager 100. The stack layer for the selected first wavelength may be combined to form a merged image that is calibrated and focus-corrected for each pixel in the merged image of the scene. Additional merged images of the scene may be generated in the same manner for additional selected wavelengths (e.g., a second selected wavelength, a third selected wavelength, etc.). Thus, a second plurality of images (e.g., a second stack layer) may be generated at a selected second wavelength, with each image in the second plurality of images being captured at a different focal point from the other images in the second plurality of images. Thus, a second stack layer for the selected second wavelength may be combined to form a second merged image that is calibrated and focus-corrected for each pixel in the merged image of the scene. The merged images for the each of the selected wavelengths may then be combined to form a multispectral image cube of the scene, which contains information about the spectral profile of the scene to be used for composition determinations of objects (e.g., rocks, sand, ice, etc.) within the scene.

Now referring to FIG. 8, the generation of a stack layer 826 may begin with the capture of an active illumination image 802 as part of a process for performing sample and calibration measurements to generate the stack layer 826. In this regard, to capture the active illumination image 802, the processing circuitry 140 may be configured to control the illumination assembly 110 to output illumination at a first wavelength, control the focusing assembly 120 to operate at a first focal point, and control the detector assembly 130 or to capture an image or multiple images that, according to some example embodiments, may be averaged into one averaged image (not shown) with an improved signal-to-noise ratio (SNR). Additionally, a passive illumination image 804 may be captured. To capture the passive illumination image 804, the processing circuitry 140 may be configured to control the illumination assembly 110 to output no illumination, control the focusing assembly 120 to operate at a first focal point, and control the detector assembly 130 to capture an image or multiple images that, according to some example embodiments, may be averaged into one averaged image (not shown) with improved SNR.

The active illumination image 802 may then be combined with the passive illumination image 804 to form a background corrected image 806. According to some example embodiments, the active illumination image 802 may be combined with the passive illumination image 804 by subtracting (e.g., background subtracting) the passive illumination image 804 from the active illumination image 802, thereby resulting in a background-subtracted (i.e. background-corrected) image 806 for a respective wavelength. Subsequently, the background corrected image 806 may be conditioned and modified to form a scattered light corrected image 808 by, for example, repeating the capturing and active and passive illumination images of a calibration target and combining these images with the background corrected image 806.

Additionally, a process for laboratory characterization calibration may be performed to generate components for combination with, or modification of, the scattered light corrected image 808 to generate the stack layer 826. In this regard, a dark image 810 may be captured and combined with a pixel map 812, which in some example embodiments may be a masked pixel map. More particularly, the pixel map 812 may include a map of non-responsive or "hot" pixels in the detector array that are masked out or eliminated from the processing. The result may be a dark pixel image 814, which may, in turn, be combined with a scattered light pixel map 816 to form a scattered dark pixel image 818. Additionally, a radiance lookup table 820 (e.g., a table indicating LED radiances), a calibration coefficient 822, and an illumination field 824 (e.g., a flat field) may be generated.

Accordingly, to form the stack layer 826, the scattered light corrected image 808 may be combined with, or modified by, the laboratory characterization calibration components. In this regard, the scattered light corrected image 808 may be combined with the scattered dark pixel image 818 using the radiance lookup table 820, the calibration coefficient 822, and the illumination field 824 to generate the stack layer 826. As such, according to some example embodiments, the stack layer 826 may be generated as a radiometrically calibrated image.

As shown in FIG. 8, the example process 800 may also include performing the same process described above for the first wavelength at a second focal point to generate another stack layer in the form of a second stack layer 828. In this regard, generation of the second stack layer 828 may involve the processing circuitry 140 being configured to control the illumination assembly 110 to output illumination at the first wavelength, control the focusing assembly 120 to operate at a second focal point, and control the detector assembly 130 to capture an active illumination image for the second stack layer 828. Similarly, to capture a passive illumination image for the second stack layer 828, the processing circuitry 140 may be configured to control the illumination assembly 110 to output no illumination, control the focusing assembly 120 to operate at the second focal point, and control the detector assembly 130 to capture an image as the passive illumination image for the second stack layer 828.

This process of generating stack layers may be repeated any number of times (e.g., for "N" focal points) to generate N respective stack layers, such as an Nth stack layer 830, etc. In this regard, the Nth stack layer 830 may be generated at the first wavelength, but for different focal points from the other stack layers 826 and 828. Thus having generated a plurality of stack layers, e.g., N stack layers, the N stack layers may then be combined to from a merged image 832 for the first wavelength. To do so, the stack layers may be calibrated to a radiance factor (I/F) and then merged after applying z-stacking to the stack layers. According to some example embodiments, the z-stacking may be a type of focus stacking to generate a composite image incorporating different focal distances to generate an image with a greater depth of field than the individual source images. In this manner, the merged image 832 may be formed as a "best-focus" layer using, for example, a median of the stack layers.

Similarly, as illustrated in FIG. 8, merged images for other wavelengths may also be generated. For example, a second merged image 834 for a second wavelength may be generated. As such, the process for generating merged images may be repeated any number of times (e.g., for N wavelengths) to generate N respective merged images, such as an Nth merged image 836. Thus, having generated a plurality of merged images, the N merged images may then be combined to form a multispectral image cube 838 for the scene. To do so, as described above, the best-focused, calibrated images for each wavelength in the form of merged images may then be merged to generate the multispectral image cube 838 as a merged, best-focused, spectral image cube including multiple wavelengths ranging from visible to infrared portions of the spectrum. As such, the multispectral image cube 838 may include information for each pixel of the scene as a calibrated reflectance spectrum from visible to infrared wavelengths. By considering each pixel across the visual and infrared spectrum, spectral artifacts can be identified or eliminated to avoid false compositional detections that are cause by spectral artifacts.

It will be understood that, although the variable "N" has been used herein to indicate the number of both stack layers and merged images, that this does not necessarily mean that the respective number of stack layers and merged images must be equal (nor does it preclude this). Rather, in an example embodiment, the number of stack layers may be different from the number of merged images, e.g., there may be "N" stack layers and "M" merged images (where N is not equal to M).

According to example embodiments, the multispectral image cube 838 for the scene is analyzed to determine information about objects in the scene. For example, the multispectral image cube 838 may provide a spectral profile of the scene, and this spectral profile may be analyzed with respect to objects (e.g., geologic objects, such as rocks, volatiles, ices, soil grains, or the like) in the scene to determine a spectral response at the location of the object. The spectral response may be compared to a library spectra for minerals or other materials to perform spectral identification. In this regard, igneous minerals, hydrated minerals (e.g., carbonates, phyllosilicates, sulfates, zeolites, hydrated silica, and the like), ices [e.g., water ($H_2O$) and carbon dioxide ($CO_2$) ices], and organic materials (e.g., pigments) may be identified. Based on the reflected wavelengths of light from the location of the object in the scene, a composition, abundance, and/or distribution associated with the object may be determined. For example, according to some example embodiments, the iron content of agglutinates within a scene may be determined. Additionally, physical form and characteristics, such as textures and the effects of weathering, of the object may also be determined.

According to some example embodiments, the multispectral image cube 838 may be further used to generate visible color and visible infrared (or visible/infrared false-color) composite images. Based on these composite images end-member maps and end-member spectra may be generated from the spectral image cube as summary maps for targeting, for example, specific mineral or material absorptions or signatures, which can be generated and downlinked. Via these summary maps and spectral end-member maps locations of identified minerals or materials may again be determined within the multispectral imager's field of view, thereby providing for rapid, non-destructive identification of minerals and other materials.

Referring now to FIG. 9, a method for multispectral image capture according to some example embodiments is shown. According to some example embodiments, the example method shown in FIG. 9 may be performed by the multispectral imager 100, or, more specifically, the processing circuitry 140 of the multispectral imager 100, though additional example embodiments are not limited thereto. In this regard, the example method may include, at step 900, generating a first plurality of images of a scene based on images captured by a detector assembly, e.g., a photodetector assembly, and illuminated by an illumination assembly at a first wavelength. In this regard, each image in the first plurality of images may be captured at a respective different focal point via adjustment of a focusing assembly. At step 910, the example method may include combining images from the first plurality of images to form a first merged image for the first wavelength. At step 920, the method may include generating a second plurality of images of the scene based on images captured by the detector assembly illuminated by the illumination assembly at a second wavelength. In this regard, each image in the second plurality of images may be captured at a respective different focal point within the second plurality of images via adjustment of the focusing assembly.

Additionally, the example method may include, at step 930, combining images from the second plurality of images to form a second merged image for the second wavelength, and, at step 940, combining the first merged image with the second merged image to form a multispectral image cube for the scene. Further, at step 950, the example method may include determining a composition of an object within the scene based on a spectral profile of the multispectral image cube.

Additionally, according to some example embodiments, generating the first plurality of images, at step 900, may include a number of operations to generate the images as a plurality of stack layers, as described about with reference to FIG. 8. In this regard, and referring now to FIG. 10, the example method shown therein may include, at step 1000, controlling the focus assembly to adjust the focal point to a first position, and, at step 1010, controlling the illumination assembly to illuminate the scene at the first wavelength. Additionally, the example method may include, at step 1020, capturing an image of the scene with illumination provided by the illumination assembly at the first wavelength as an active illumination image. Further, the example method may include, at step 1030, capturing an image of the scene with no illumination provided by the illumination assembly as a passive illumination image. Further, at step 1040, the example method may include combining the active illumination image with the passive illumination image to form a first stack layer of a plurality of stack layers. Additionally or alternatively, according to some example embodiments, the example method may further include forming the first stack layer by combining a dark image with the passive illumination image and the active illumination image, resulting in a background corrected image. Additionally or alternatively, the example method may, according to some example embodiments, further include determining the composition of the object with respect to visible and infrared spectral bands associated with respective spectral material absorption. Additionally or alternatively, the example method may, according to some example embodiments, further include determining the composition of the object with respect to visible and infrared spectral bands associated with the respective spectral absorption of the object's material.

Additionally or alternatively, according to some example embodiments, the illumination assembly of the example method may include an array of illuminating elements that are disposed in a radial pattern around an optical path to a lens of the focusing assembly and a detector array of the detector assembly. Additionally or alternatively, each illuminating element of the example method may include an emitter configured to emit light including the first wavelength, a collimator structure including a collimating aperture configured to channel the light emitted by the light emitter through the collimating aperture, a filter structure disposed (e.g., mounted) on the collimator structure, and a narrow-bandpass filter disposed (e.g., mounted) on the filter structure. The filter structure may include a filter aperture aligned with the collimating aperture. The narrow-bandpass filter may be configured to pass light at a band including the first wavelength and filter light at wavelengths outside of the band. Additionally or alternatively, the illumination assembly of the example method may further include a thermoelectric cooler controlled by processing circuitry to maintain the illuminating elements within a defined temperature band to prevent temperature-induced wavelength shifting. Additionally or alternatively, according to some example embodiments, each illuminating element of the array of illuminating elements may be separately connected for independent control to provide redundancy in an event of a failure of one of the illuminating elements. Additionally or alternatively, the array of illuminating elements may include a first group of illuminating elements configured to output light at the first wavelength. In this regard, the first wavelength may be a visible wavelength. Further, the array of illuminating elements may also include a second group of illuminating elements configured to output light at the second wavelength. In this regard, the second wavelength may be a first infrared wavelength. Additionally, the array of illuminating elements may also include a third group of illuminating elements configured to output light at the third wavelength. In this regard, the third wavelength may be a first ultraviolet wavelength.

Additionally or alternatively, according to some example embodiments, the processing circuitry configured to perform the example method may include a thermal transfer device, such as a cryocooler, configured to be controlled by the processing circuitry to maintain the detector array within a defined temperature band. Additionally or alternatively, according to some example embodiments, the focusing assembly may further include a filter wheel including a number of filter windows. In this regard, each filter window of the filter wheel may be configured to pass a spectral band of light. A first window may be configured to pass light in a visible band and a second widow may be configured to pass light in an infrared band. Additionally or alternatively, according to some example embodiments, the focusing assembly may further include a stepper motor controlled by the processing circuitry and configured to move the lens to adjust a focal point for the detector array. Additionally or alternatively, according to some example embodiments, the focusing assembly may further include an actuator controlled by the processing circuitry and configured to move a filter wheel including a number of filter windows. Additionally or alternatively, according to some example embodiments, a spectral range of the multispectral imager configured to perform the example method may be from about 0.4 microns to about 2.6 microns (or, alternatively, from exactly 0.4 microns to exactly 2.6 microns), and may be expandable up to about 4 microns (or, alternatively, exactly 4 microns).

In some embodiments of the example methods described above, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments.

The embodiments presented herein are provided as examples and therefore the disclosure is not to be limited to the specific embodiments disclosed. Modifications and other embodiments are intended to be included within the scope of the appended claims. Moreover, although the foregoing descriptions and the associated drawings describe example embodiments in the context of certain example combinations of elements and/or functions, different combinations of elements and/or functions may be used to form alternative embodiments. In this regard, for example, different combinations of elements and/or functions other than those explicitly described above are also contemplated. Similarly, where specific numerical values (or ranges of numerical values) are used or given above, it will be understood that use the adverb "about" does not necessarily mean that example embodiments do not include features having the exact value, nor does the use of an exact numerical value preclude deviations from that value in alternative example embodiments. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments.

What is claimed is:

1. A multispectral imager comprising:
    processing circuitry;
    an illumination assembly comprising an array of illumination elements, the illumination assembly being configured to be controlled by the processing circuitry to illuminate a scene at a plurality of wavelengths comprising a first wavelength and a second wavelength;
    a detector assembly comprising a detector array, the detector assembly being configured to be controlled by the processing circuitry to capture images at the plurality of wavelengths; and
    a focusing assembly comprising a lens, the focusing assembly being configured to be controlled by the processing circuitry to adjust a focal point for the detector array;
    wherein the processing circuitry is configured to:
        generate a first plurality of images of the scene based on images captured by the detector assembly illuminated by the illumination assembly at the first wavelength, each image in the first plurality of images being captured at a respective different focal point;
        combine the images of the first plurality of images to form a first merged image for the first wavelength;
        generate a second plurality of images of the scene based on images captured by the detector assembly illuminated by the illumination assembly at the second wavelength, each image in the second plurality of images being captured at a respective different focal point;
        combine the images of the second plurality of images to form a second merged image for the second wavelength;
        combine the first merged image with the second merged image to form a multispectral image cube for the scene; and
        determine a composition of an object within the scene based on a spectral profile of the multispectral image cube.

2. The multispectral imager of claim 1, wherein the processing circuitry is further configured to generate the first plurality of images as a plurality of stack layers;
    wherein the processing circuitry being further configured to generate the plurality of stack layers comprises being configured to:
    control the focus assembly to adjust the focal point to a first position;
    control the illumination assembly to illuminate the scene at the first wavelength;
    capture an image of the scene with illumination provided by the illumination assembly at the first wavelength as an active illumination image;
    capture an image of the scene with no illumination provided by the illumination assembly as a passive illumination image; and combine the active illumination image with the passive illumination image to form a first stack layer of the plurality of stack layers.

3. The multispectral imager of claim 2, wherein the processing circuitry is further configured to form the first stack layer by combining a dark image with the passive illumination image and the active illumination image, resulting in a background corrected image.

4. The multispectral imager of claim 1, wherein the processing circuitry is further configured to determine the composition of the object based on infrared spectral bands and respective spectral absorption of the object.

5. The multispectral imager of claim 1, wherein illumination elements of the array of illumination elements are disposed in a radial pattern around an optical path to the lens of the focusing assembly and the detector array.

6. The multispectral imager of claim 1, wherein at least one illumination element of the array of illumination elements comprises:
an emitter configured to emit light at the first wavelength;
a collimator structure comprising a collimating aperture configured to channel the light emitted by the emitter through the collimating aperture;
a filter structure disposed on the collimator structure, the filter structure comprising a filter aperture aligned with the collimating aperture; and
a narrow-bandpass filter disposed on the filter structure, the narrow-bandpass filter being configured to pass light at a band at the first wavelength and filter light at wavelengths outside of the band.

7. The multispectral imager of claim 1, wherein the illumination assembly further comprises a thermoelectric cooler controlled by the processing circuitry to maintain at least one illumination element of the array of illumination elements within a defined temperature band to prevent temperature-induced wavelength shifting.

8. The multispectral imager of claim 1, wherein each illumination element of the array of illumination elements is separately connected for independent control to provide redundancy in an event of a failure of one of the illumination elements.

9. The multispectral imager of claim 1, wherein the array of illumination elements comprises:
a first group of illumination elements configured to output light at the first wavelength, the first wavelength being a visible wavelength;
a second group of illumination elements configured to output light at the second wavelength, the second wavelength being an infrared wavelength; and
a third group of illumination elements configured to output light at a third wavelength, the third wavelength being an ultraviolet wavelength.

10. The multispectral imager of claim 1, wherein the detector assembly comprises a thermal transfer device configured to be controlled by the processing circuitry to maintain the detector array within a defined temperature band.

11. The multispectral imager of claim 1, wherein the focusing assembly further comprises a filter wheel comprising a plurality of filter windows, each filter window of the a plurality of filter windows being configured to pass a spectral band of light, wherein a first filter window of the plurality of filter windows is configured to pass light in a visible band and a second filter window of the plurality of filter windows is configured to pass light in an infrared band.

12. The multispectral imager of claim 1, wherein the focusing assembly further comprises a stepper motor controlled by the processing circuitry and configured to move the lens to adjust the focal point for the detector array.

13. The multispectral imager of claim 1, wherein the focusing assembly further comprises an actuator controlled by the processing circuitry and configured to move a filter wheel comprising a plurality of filter windows.

14. The multispectral imager of claim 1, wherein a spectral range of the multispectral imager is from one of about 0.4 microns to about 2.6 microns, about 0.4 microns to about 3.6 microns, and about 0.4 microns to about 4.0 microns.

15. A multispectral imaging method comprising:
generating a first plurality of images of a scene based on images captured by a detector assembly and illuminated by an illumination assembly at a first wavelength, each image in the first plurality of images being captured at a respective different focal point within the first plurality of images via adjustment of a focusing assembly;
combining the images of the first plurality of images to form a first merged image for the first wavelength;
generating a second plurality of images of the scene based on images captured by the detector assembly illuminated by the illumination assembly at a second wavelength, each image in the second plurality of images being captured at a respective different focal point within the second plurality of images via adjustment of the focusing assembly;
combining the images of the second plurality of images to form a second merged image for the second wavelength;
combining the first merged image with the second merged image to form a multispectral image cube for the scene; and
determining a composition of an object within the scene based on a spectral profile of the multispectral image cube.

16. The multispectral imaging method of claim 15, further comprising generating the first plurality of images as a plurality of stack layers,
wherein the generating the plurality of stack layers comprises:
controlling the focus assembly to adjust a focal point to a first position;
controlling the illumination assembly to illuminate the scene at the first wavelength;
capturing an image of the scene with illumination provided by the illumination assembly at the first wavelength as an active illumination image;
capturing an image of the scene with no illumination provided by the illumination assembly as a passive illumination image; and
combining the active illumination image with the passive illumination image to form a first stack layer of the plurality of stack layers.

17. The multispectral imaging method of claim 16, further comprising forming the first stack layer by combining a dark image with the passive illumination image and the active illumination image, resulting in a background corrected image.

18. The multispectral imaging method of claim 15, further comprising determining the composition of the object based on infrared spectral bands and respective spectral absorption of the object.

19. The multispectral imaging method of claim 15, wherein the illumination assembly comprises an array of illumination elements that are disposed in a radial pattern around an optical path to a lens of the focusing assembly and a detector array of the detector assembly.

20. The multispectral imaging method of claim 15, wherein each illumination element comprises:
   an emitter configured to emit light at the first wavelength;
   a collimator structure comprising a collimating aperture configured to channel the light emitted by the emitter through the collimating aperture;
   a filter structure disposed on the collimator structure, the filter structure comprising a filter aperture aligned with the collimating aperture; and
   a narrow-bandpass filter disposed on the filter structure, the narrow-bandpass filter being configured to pass light at a band at the first wavelength and filter light at wavelengths outside of the band.

* * * * *